(12) United States Patent
Yu et al.

(10) Patent No.: US 12,710,607 B2
(45) Date of Patent: Aug. 18, 2026

(54) PHOTONIC SEMICONDUCTOR DEVICE AND METHOD OF MANUFACTURE

(71) Applicant: Taiwan Semiconductor Manufacturing Co., Ltd., Hsinchu (TW)

(72) Inventors: Chen-Hua Yu, Hsinchu (TW); Jiun Yi Wu, Zhongli City (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 442 days.

(21) Appl. No.: 18/329,464

(22) Filed: Jun. 5, 2023

(65) Prior Publication Data

US 2024/0280772 A1 Aug. 22, 2024

Related U.S. Application Data

(60) Provisional application No. 63/493,011, filed on Mar. 30, 2023, provisional application No. 63/486,277, filed on Feb. 22, 2023.

(51) Int. Cl.
*G02B 6/42* (2006.01)

(52) U.S. Cl.
CPC ......... *G02B 6/4283* (2013.01); *G02B 6/4215* (2013.01); *G02B 6/4232* (2013.01); *G02B 6/428* (2013.01)

(58) Field of Classification Search
None
See application file for complete search history.

(56) References Cited

U.S. PATENT DOCUMENTS

| | | | | |
|---|---|---|---|---|
| 8,993,380 | B2 | 3/2015 | Hou et al. | |
| 9,281,254 | B2 * | 3/2016 | Yu | H01L 24/97 |
| 9,299,649 | B2 | 3/2016 | Chiu et al. | |
| 9,372,206 | B2 | 6/2016 | Wu et al. | |
| 9,425,126 | B2 | 8/2016 | Kuo et al. | |
| 9,443,783 | B2 * | 9/2016 | Lin | H01L 21/563 |
| 9,461,018 | B1 | 10/2016 | Tsai et al. | |
| 9,496,189 | B2 | 11/2016 | Yu et al. | |
| 9,666,502 | B2 | 5/2017 | Chen et al. | |
| 9,735,131 | B2 | 8/2017 | Su et al. | |
| 2017/0045683 | A1 | 2/2017 | Usami | |
| 2018/0314003 | A1 * | 11/2018 | Coolbaugh | G02B 6/4232 |
| 2021/0018678 | A1 * | 1/2021 | Yu | G02B 6/12004 |
| 2022/0043208 | A1 * | 2/2022 | Hsia | G02B 6/30 |
| 2022/0187536 | A1 * | 6/2022 | Sharma | H01L 25/0657 |

FOREIGN PATENT DOCUMENTS

| | | | |
|---|---|---|---|
| CN | 114400504 | A | 4/2022 |
| DE | 102021109161 | A1 | 12/2021 |
| TW | 202013767 | A | 4/2020 |
| TW | I755741 | B | 2/2022 |

* cited by examiner

*Primary Examiner* — Jerry Rahll
(74) *Attorney, Agent, or Firm* — Slater Matsil, LLP

(57) ABSTRACT

A method includes forming a first redistribution structure on a first substrate; forming a waveguide structure on a second substrate, wherein the waveguide structure includes waveguides; bonding the waveguide structure to the redistribution structure using dielectric-to-dielectric bonding; removing the second substrate; forming a second redistribution structure on the waveguide structure; and connecting a photonic package to the second redistribution structure, wherein the photonic package is optically coupled to the waveguides.

20 Claims, 31 Drawing Sheets

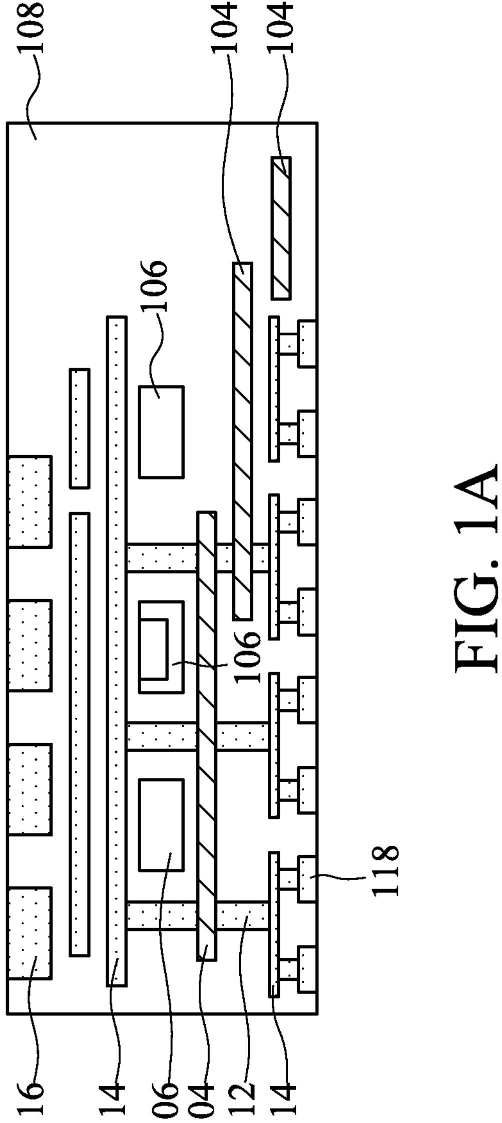
FIG. 1A
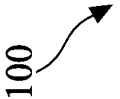

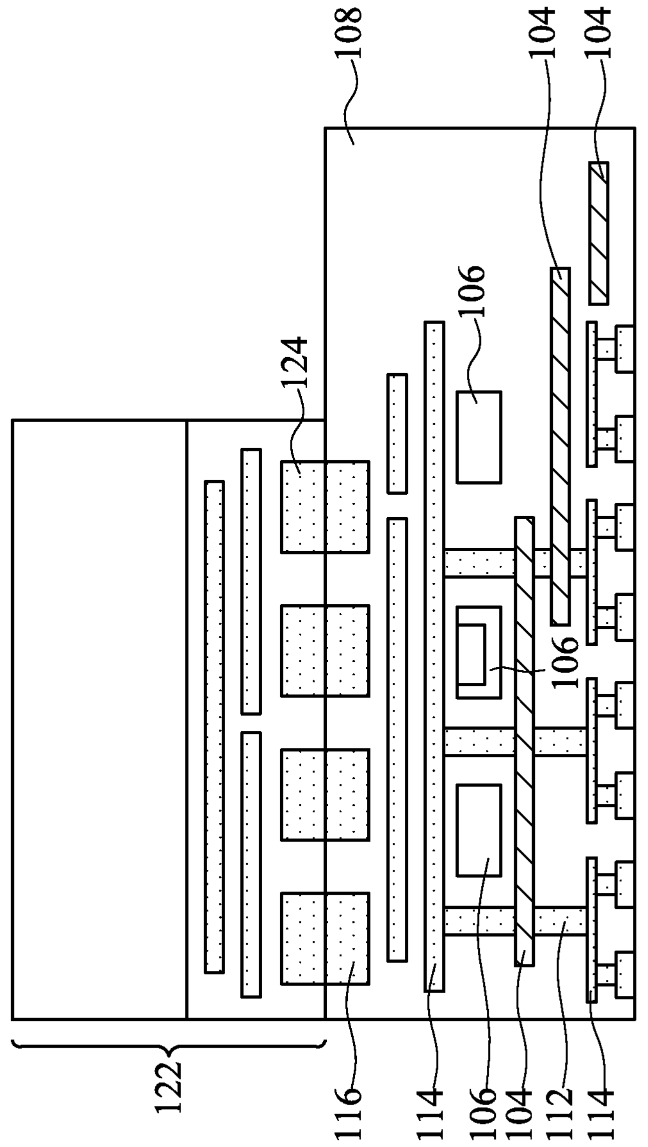
FIG. 1B
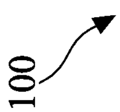

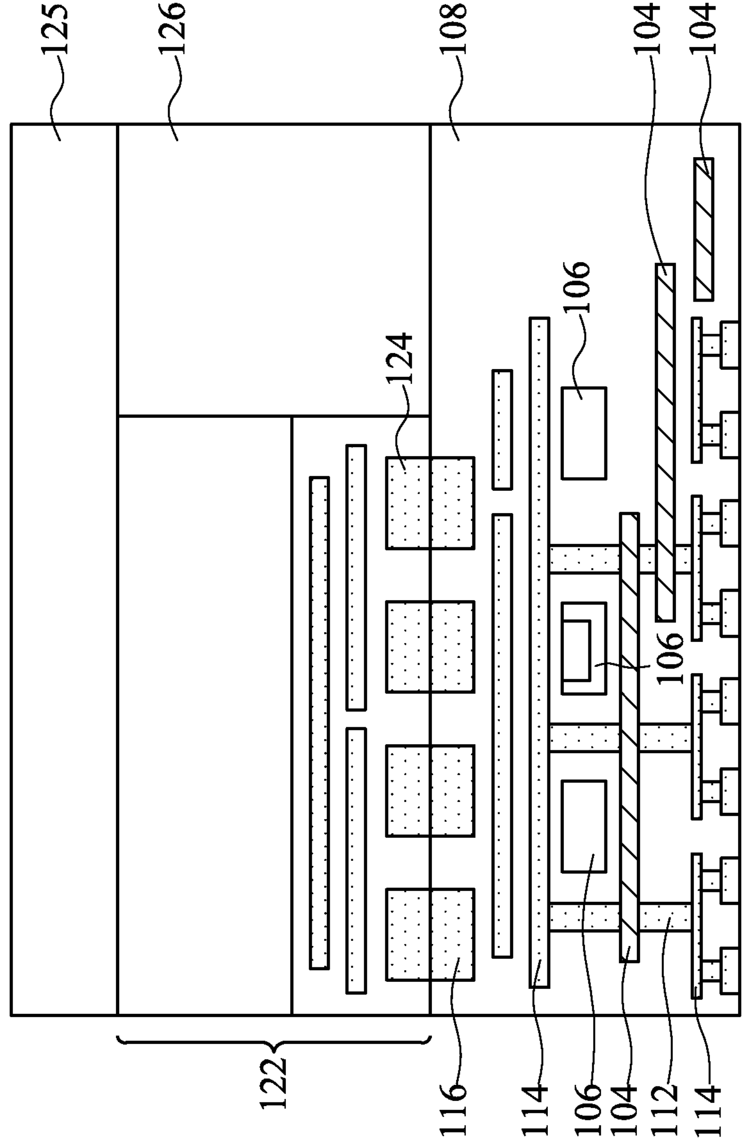
FIG. 1C
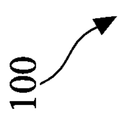

200

212
204
202
214
200
210

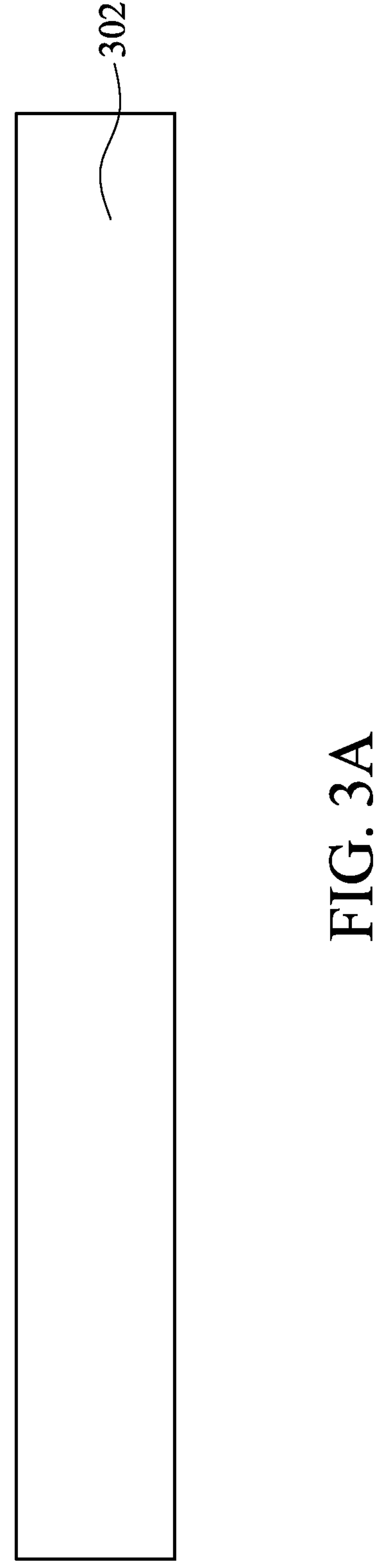
FIG. 3A
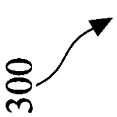

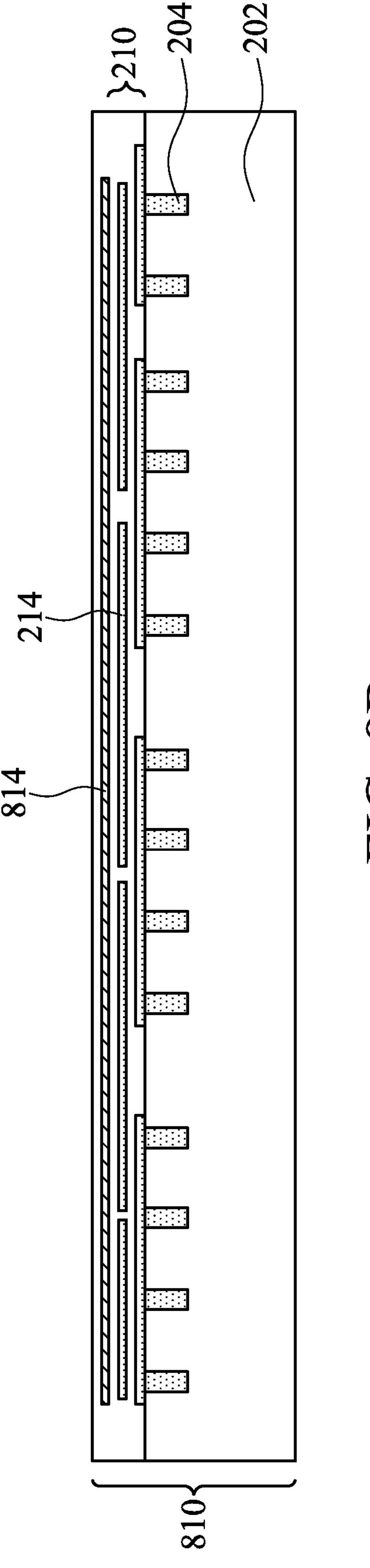
210
204
202
214
814
810
FIG. 8B
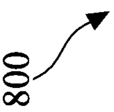
800

310
204
202
800
300
810

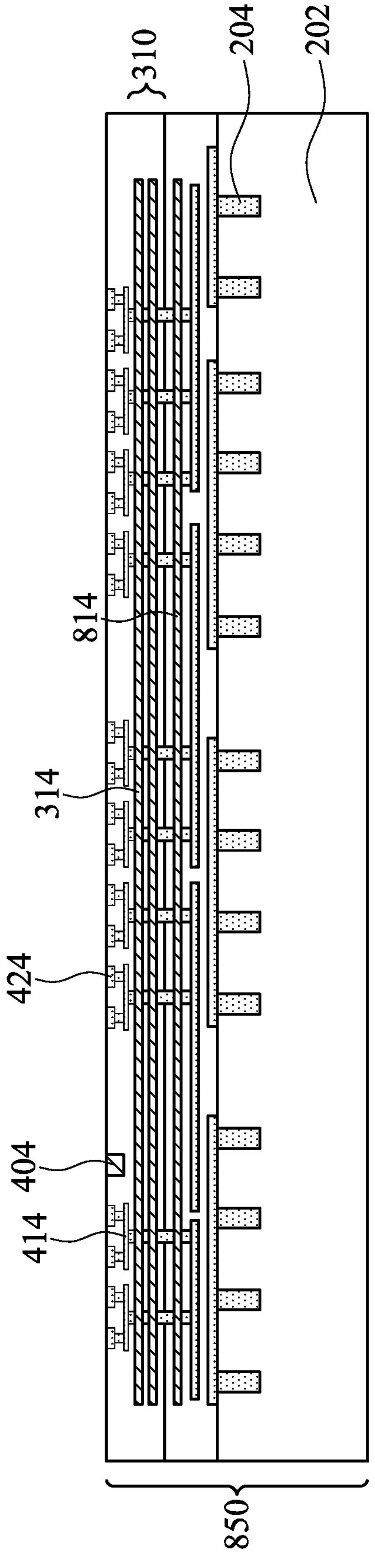
310
204
202
814
314
424
404
414
850
FIG. 8E
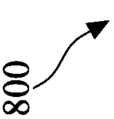
800

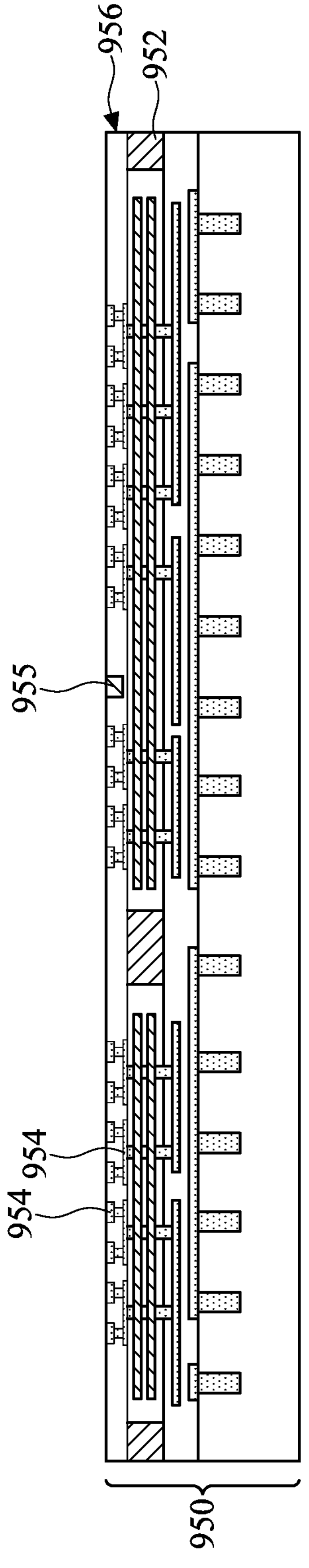
956
952
955
954
954
950
FIG. 9E
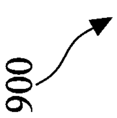
900

PHOTONIC SEMICONDUCTOR DEVICE AND METHOD OF MANUFACTURE

PRIORITY CLAIM AND CROSS-REFERENCE

This application claims the benefits of U.S. Provisional Application No. 63/493,011, filed on Mar. 30, 2023, and U.S. Provisional Application No. 63/486,277, filed on Feb. 22, 2023, which applications are hereby incorporated herein by reference in their entirety.

BACKGROUND

Electrical signaling and processing are one technique for signal transmission and processing. High bandwidth networking and high performance computing have become more popular and widely used in advanced package application, especially for servers, A.I. (Artificial Intelligence), supercomputing, and related products. However, many existing solutions using copper interconnects cannot meet low insertion loss requirements, low latency requirements, and low power consumption requirements while providing increased bandwidth and data rate.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 1A, 1B, and 1C illustrate cross-sectional views of intermediate steps of forming a photonic package, in accordance with some embodiments.

FIGS. 3A and 3B illustrate cross-sectional views of intermediate steps of forming an optical routing structure, in accordance with some embodiments.

FIGS. 8A, 8B, 8C, 8D, 8E, and 8F illustrate cross-sectional views of intermediate steps of forming an interconnect structure, in accordance with some embodiments.

FIGS. 9A, 9B, 9C, 9D, 9E, and 9F illustrate cross-sectional views of intermediate steps of forming an interconnect structure, in accordance with some embodiments.

DETAILED DESCRIPTION

Figure 2A:
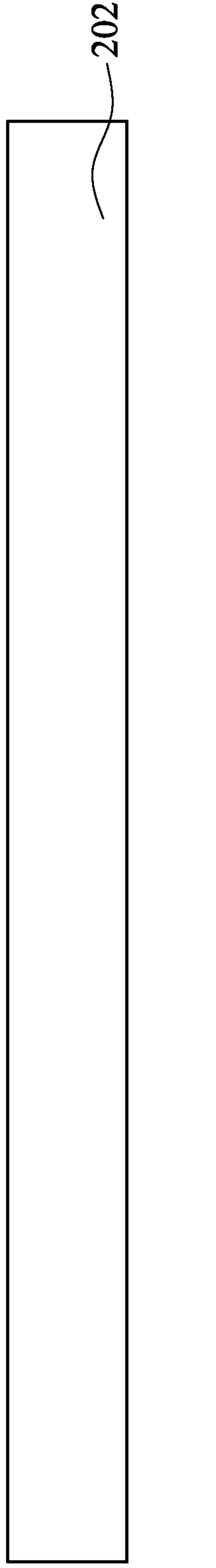
FIGS. 2A, 2B, and 2C illustrate cross-sectional views of intermediate steps of forming a routing structure, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In this disclosure, various aspects of a package and the formation thereof are described. Three-dimensional (3D) or 2.5D packages including both optical devices and electrical devices and the method of forming the same are provided, in accordance with some embodiments. In particular, photonic interposers or photonic structures including silicon nitride waveguides are formed. The photonic structures are formed, in some embodiments, by forming a structure having conductive routing on a first substrate and forming a structure having silicon nitride waveguides on a second substrate. The routing structure and the waveguide structure are bonded together to form a photonic structure. By forming the conductive routing and the silicon nitride waveguides on separate substrates, a high-temperature thermal process may be performed on the silicon nitride waveguides to improve optical characteristics of the silicon nitride waveguides without damaging the conductive routing. Forming a photonic structure in this manner can provide reduced optical loss, improved efficiency, and improved high-speed communication of a photonic system. The intermediate stages of forming the packages and structures are illustrated, in accordance with some embodiments. Some variations of some embodiments are discussed. Throughout the various views and illustrative embodiments, like reference numbers are used to designate like elements.

FIGS. 1A, 1B, and 1C show cross-sectional views of intermediate steps of forming a photonic package 100 (see FIG. 1C), in accordance with some embodiments. In some embodiments, the photonic package 100 acts as an input/output (I/O) interface between optical signals and electrical signals in a photonic system. For example, one or more photonic packages 100 may be used in a photonic system such as the photonic system 600 (see FIG. 6), the like, or another photonic system. The photonic package 100 shown in FIGS. 1A-1C is a representative example, and other photonic packages are possible.

Turning to FIG. 1A, waveguides 104, photonic components 106, and electrical routing 114 are formed within a plurality of dielectric layers 108, in accordance with some embodiments. In some embodiments, a substrate (not individually indicated) may first be provided. The substrate may be, for example, a buried oxide ("BOX") substrate comprising a buried oxide layer and a semiconductor layer over the buried oxide layer. In other embodiments, the substrate may be, for example, glass, ceramic, dielectric, a semiconductor, the like, or a combination thereof. In some embodiments, the substrate may be a semiconductor substrate, such as a bulk semiconductor or the like, which may be doped (e.g., with a p-type or an n-type dopant) or undoped. The substrate may be a wafer, such as a silicon wafer (e.g., a 12 inch silicon wafer). Other substrates, such as a multi-layered or gradient substrate may also be used. In some embodiments, the semiconductor material of the substrate may include silicon; germanium; a compound semiconductor including silicon carbide, gallium arsenic, gallium phosphide, indium phosphide, indium arsenide, and/or indium antimonide; an alloy semiconductor including SiGe, GaAsP, AlInAs, AlGaAs, GaInAs, GaInP, and/or GaInAsP; or combinations thereof. The oxide layer may be, for example, a silicon oxide or the like.

In some embodiments, one or more semiconductor layers of the substrate are patterned to form a plurality of photonic components 106, which may also be referred to as silicon devices. Some examples of the photonic components 106 include waveguides 104, photonic devices, optical modulators, mode converters, photodetectors, grating couplers, or the like. The semiconductor layer may be patterned using suitable photolithography and etching techniques, which may involve etching processes using photoresists to define patterns. In accordance with some embodiments, the photonic components 106 are physically and/or optically coupled to a waveguide 104 in order to optically interact with that waveguide 104 through optical signals. The waveguide 104 may be formed with the photonic components 106 (e.g. formed from the same semiconductor layer) or may be formed in separate manufacturing steps. For example, a photodetector may be optically coupled to a waveguide 104 to detect optical signals within the waveguide 104 and generate electrical signals corresponding to the optical signals. A modulator may also receive electrical signals and modulate optical power within a waveguide 104 to generate corresponding optical signals. In this manner, a photonic components 106 may input optical signals from, or output optical signal to, a waveguide 104. In accordance with other embodiments, the photonic components 106 may include other active or passive components, such as laser diodes, optical signal splitters, grating couplers, edge couplers, or other types of photonic components or devices.

In some embodiments, multiple layers of waveguides 104 may be formed in the dielectric layers 108. The waveguides 104 may be optically coupled to other waveguides 104 in the same layer and/or in a neighboring layer. For example, the waveguides 104 may be optically coupled using edge couplers, grating couplers, mode converters, or other types of optically coupling structures. The waveguides 104 may be formed of similar materials or different materials. For example, in some embodiments, the waveguides 104 may be formed of silicon. Silicon waveguides may be formed, for example, by depositing a layer of silicon and then patterning the layer of silicon using suitable photolithography and etching techniques. A respective dielectric layer may be deposited over each layer of silicon waveguides. In some embodiments, the waveguides 104 may be formed of silicon nitride. Nitride Silicon nitride waveguides may be formed, for example, by depositing a layer of silicon nitride and then patterning the layer of silicon nitride using suitable photolithography and etching techniques. The deposition process may include CVD, PECVD, LPCVD, PVD, or the like. In other embodiments, the waveguides 104 may be formed of silicon oxynitride, polymer, or another material. Other materials are possible. A photonic package 100 may comprise one type of waveguide or multiple types of waveguides. In some cases, nitride waveguides may have advantages over silicon waveguides, described in greater detail below.

The dielectric layers 108 may comprise one or more suitable materials such as silicon oxide, polymer, spin-on glass, flowable oxide, or the like. The dielectric layers 108 may be formed using suitable techniques, such as CVD, flowable CVD, PVD, spin-on coating, lamination, or the like. In some embodiments, one or more of the dielectric layers 108 may be planarized using a chemical mechanical polish (CMP) process or the like.

Still referring to FIG. 1A, electrical routing 114, through vias 112, bond pads 116, and/or bond pads 118 may be formed in or on various dielectric layers 108, in accordance with some embodiments. The electrical routing 114 may comprise conductive lines, conductive vias, conductive contacts, redistribution layers, metallization layers, or the like. The electrical routing 114 may electrically contact the photonic components 106, and may provide interconnections therebetween in some embodiments. In some embodiments, through vias 112 may be formed extending through one or more dielectric layers 108 to electrically connect different regions of electrical routing 114. Bond pads 116/118 may be formed on upper or lower surfaces of the dielectric layers 108 to allow for electrical connection to other structures, dies, substrates, components, or the like.

The electrical routing 114, through vias 112, bond pads 116, and/or bond pads 118 may be formed in one or more suitable processes. For example, the process may comprise a damascene process, a dual damascene process, or another suitable process. As another example, the formation of the through vias may include etching-through one or more dielectric layers 108 to form openings and then filling the openings with conductive materials such as titanium nitride, tantalum nitride, titanium, copper, tungsten, cobalt, ruthenium, the like, or a combination thereof. There may or may not be a dielectric liner formed encircling the various conductive materials used in any of these conductive features. In some embodiments, the bond pads 116 and/or the bond pads 118 may be conductive pads, conductive pillars, or the like. Other conductive features, arrangements, or configurations are possible.

In FIG. 1B, one or more electronic dies 122 are bonded to the bond pads 116, in accordance with some embodiments. The electronic dies 122 may be, for example, semiconductor devices, dies, or chips that communicate with the photonic components 106 using electrical signals. One electronic die 122 is shown in FIG. 1B, but a photonic package 100 may include two or more electronic dies 122 in other embodiments. In some cases, multiple electronic dies 122 may be incorporated into a single photonic package 100 in order to reduce processing cost. The electronic die 122 may include die connectors 124, which may be, for example, conductive pads, conductive pillars, or the like.

The electronic die 122 may include integrated circuits for interfacing with the photonic components 106, such as circuits for controlling the operation of the photonic components 106. For example, the electronic die 122 may include controllers, drivers, transimpedance amplifiers, the like, or combinations thereof. The electronic die 122 may also include a CPU, in some embodiments. In some embodiments, the electronic die 122 includes circuits for processing electrical signals received from photonic components 106, such as for processing electrical signals received from a photonic component 106 comprising a photodetector. The electronic die 122 may control high-frequency signaling of the photonic components 106 according to electrical signals (digital or analog) received from another device or die, in some embodiments. In some embodiments, the electronic die 122 may be an electronic integrated circuit (EIC) or the like that provides Serializer/Deserializer (SerDes) functionality. In this manner, the electronic die 122 may act as part of an I/O interface between optical signals and electrical signals within a photonic package 100, and the photonic package 100 described herein could be a considered system-on-chip (SoC) or a system-on-integrated-circuit (SoIC) device.

In some embodiments, an electronic die 122 is bonded by dielectric-to-dielectric bonding and/or metal-to-metal bonding (e.g., direct bonding, fusion bonding, oxide-to-oxide bonding, hybrid bonding, or the like). In such embodiments, covalent bonds may be formed between bonding layers, such as the topmost dielectric layer 108 and surface dielectric layers (not individually shown) of the electronic die 122. During the bonding, metal-to-metal bonding may also occur between the die connectors 124 of the electronic die 122 and the bond pads 116.

In FIG. 1C, a dielectric material 126 is formed over the electronic die 122 and the dielectric layers 108, in accordance with some embodiments. The dielectric material 126 may be formed of silicon oxide, silicon nitride, a polymer, the like, or a combination thereof. The dielectric material 126 may be formed by CVD, PVD, ALD, a spin-on-dielectric process, the like, or a combination thereof. In some embodiments, the dielectric material 126 may be formed by HDP-CVD, FCVD, the like, or a combination thereof. The dielectric material 126 may be a gap-fill material in some embodiments, which may include one or more of the example materials above. Other dielectric materials formed by any acceptable process may be used. The dielectric material 126 may be planarized using a planarization process such as a CMP process, a grinding process, or the like. In some embodiments, the planarization process may expose the electronic die 122 such that a surface of the electronic die 122 and a surface of the dielectric material 126 are coplanar.

Further in FIG. 1C, an optional support 125 is attached to the structure, in accordance with some embodiments. The support 125 is a rigid structure that is attached to the structure in order to provide structural or mechanical stability. The use of a support 125 can reduce warping or bending, which can improve the performance of the optical structures such as the waveguides 104 or photonic components 106. The support 125 may comprise one or more materials such as silicon (e.g., a silicon wafer, bulk silicon, or the like), a silicon oxide, a metal, an organic core material, the like, or another type of material. The support 125 may be attached to the structure (e.g., to the dielectric material 126 and/or the electronic dies 122) using an adhesive layer, direct bonding, or another suitable technique. The support 125 may also have lateral dimensions (e.g., length, width, and/or area) that are greater than, about the same as, or smaller than those of the structure.

Figure 2B:
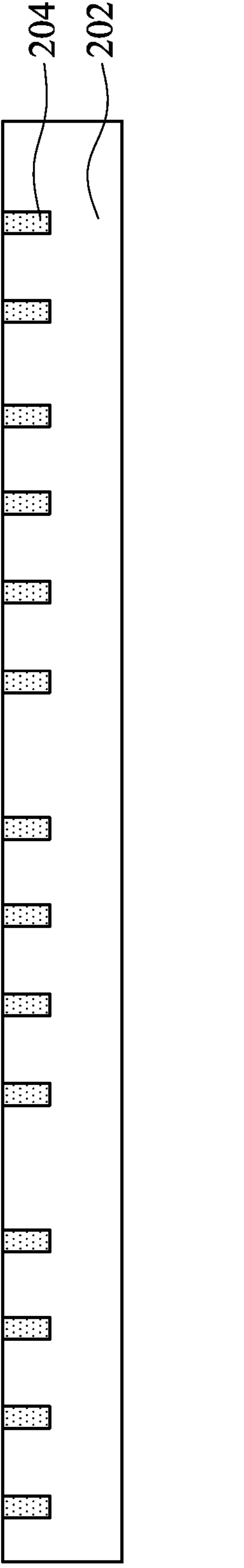
Figure 2C:
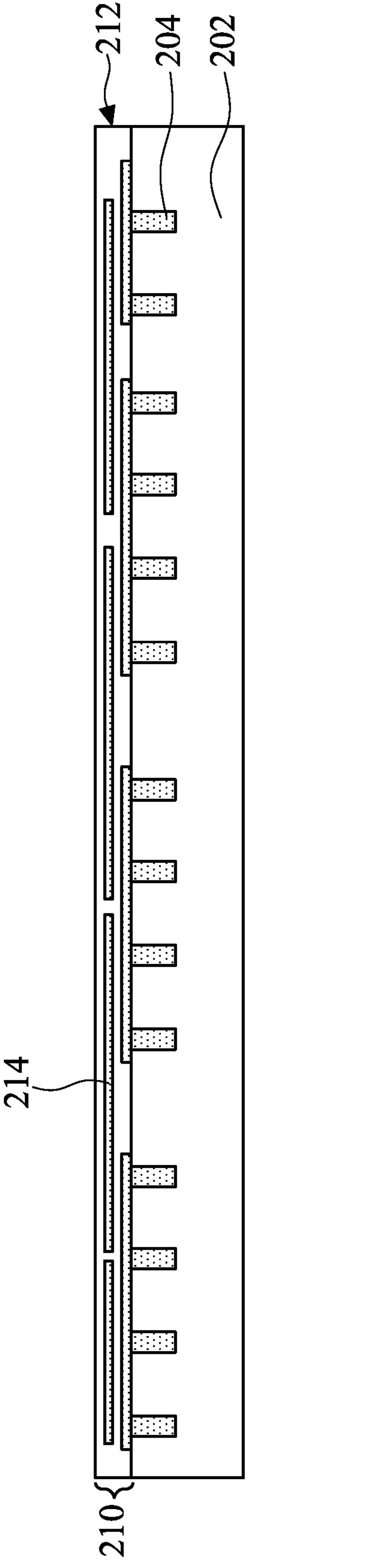

FIGS. 2A, 2B, and 2C illustrate the formation of a routing structure 200, in accordance with some embodiments. The routing structure 200 comprises a redistribution structure 210 that may be electrically connected to vias 204, in some embodiments. In this manner, the routing structure 200 may provide electrical routing and electrical interconnections for a photonic system. The routing structure 200 may include passive or active devices, in some embodiments. In some embodiments, the routing structure 200 may be another type of structure, such as an integrated fan-out structure, an interconnect substrate, an interposer, or the like. FIG. 2A illustrates a substrate 202, in accordance with some embodiments. The substrate 202 may be for example, a glass substrate, a ceramic substrate, a dielectric substrate, an organic substrate (e.g., an organic core), a semiconductor substrate (e.g., a semiconductor wafer), the like, or a combination thereof. The substrate 202 may be referred to as having a front side or front surface (e.g., the side facing upwards in FIG. 2A), and a back side or back surface (e.g., the side facing downwards in FIG. 2A).

In FIG. 2B, vias 204 are formed in the front side of the substrate 202, in accordance with some embodiments. The vias 204 may be formed, for example, by forming openings in the front side of the substrate 202 and then filling the openings with conductive material. The openings may extend partially into the substrate 202, and may be formed using suitable photolithography and etching techniques. In some embodiments, a liner (not shown), such as a diffusion barrier layer, an adhesion layer, or the like, may first be formed in the openings. In some embodiments, a seed layer (not shown), which may include copper, a copper alloy, or the like may then be deposited in the openings. The conductive material of the vias 204 may be formed in the openings using, for example, plating, electro-less plating, or the like. The conductive material may include, for example, a metal or a metal alloy such as copper, silver, gold, tungsten, cobalt, aluminum, or alloys thereof. A planarization process, such as a CMP process or mechanical grinding may be performed to remove excess conductive material, such that top surfaces of the vias 204 and the substrate 202 are level. This is an example, and other materials or techniques are possible.

In FIG. 2C, a redistribution structure 210 is formed on the front side of the substrate 202 and on the vias 204, in accordance with some embodiments. The redistribution structure 210 includes dielectric layers 212 and conductive features 214 formed in the dielectric layers 212 that provide interconnections and electrical routing. The dielectric layers 212 may be, for example, insulating or passivating layers, and may comprise one or more materials similar to those described above for the dielectric layers 108, such as a silicon oxide, silicon nitride, polymer, molding material, encapsulant, or a different material. In some embodiments, each of the dielectric layers 212 may have a thickness in the range of about 100 nm to about 3000 nm. The conductive features 214 may include conductive lines, conductive vias, metallization layers, redistribution layers, or the like, and may be formed by a damascene process, e.g., single damascene, dual damascene, or the like. The conductive features 214 may comprise a conductive material such as copper. In some embodiments, the conductive material of a conductive feature 214 may have a thickness in the range of about 100 nm to about 3000 nm or a width in the range of about 100 nm to about 4000 nm. Other materials, thicknesses, dimensions, or techniques are possible. The conductive features 214 may be electrically connected to the vias 204. The redistribution structure 210 may comprise one layer of conductive features 214 or multiple layers of conductive features 214. In some embodiments, the topmost dielectric layer 212 (e.g., the dielectric layer 212 on the front side of the routing structure 200) may be a material suitable for dielectric-to-dielectric bonding, such as silicon oxide, silicon oxynitride, silicon carbonitride, or another suitable bonding material formed using CVD or another suitable technique. Individual routing structures 200 may be subsequently singulated from the substrate 202, in some embodiments.

Figure 3B:
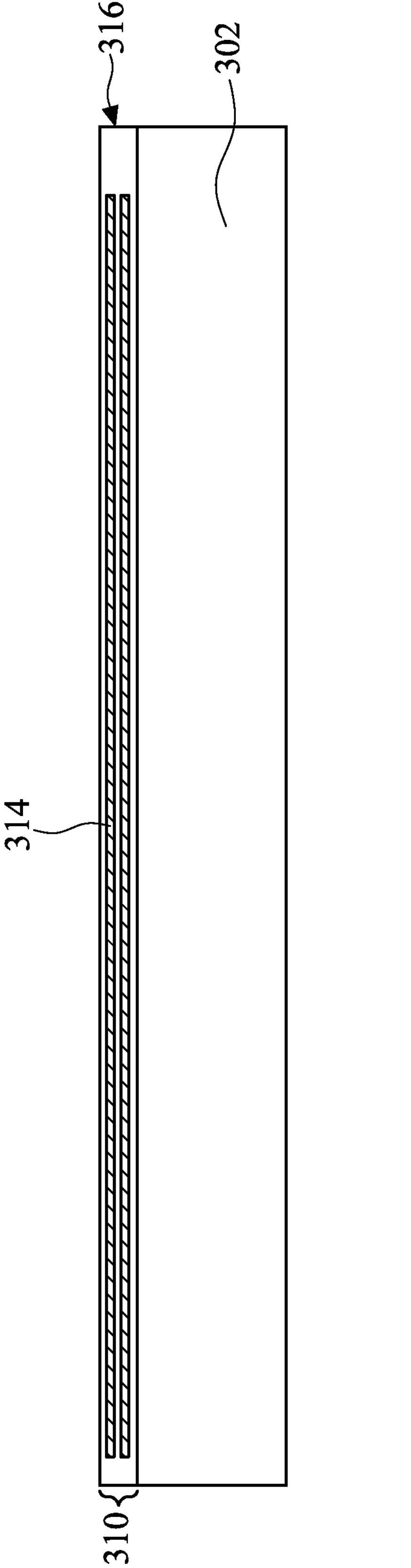

FIGS. 3A and 3B illustrate the formation of an optical routing structure 300, in accordance with some embodiments. The optical routing structure 300 comprises a waveguide structure 310 that comprises one or more waveguides 314 formed in one or more dielectric layers 316, in some embodiments. In this manner, the optical routing structure 300 may provide optical routing and optical interconnections for a photonic system. The optical routing structure 300 may include passive or active devices, in some embodiments. In some embodiments, the optical routing structure 300 may be another type of structure, such as an integrated fan-out structure, an interconnect substrate, an interposer, or the like. FIG. 3A illustrates a substrate 302, in accordance with some embodiments. The substrate 302 may be for example, a glass substrate, a ceramic substrate, a dielectric substrate, an organic substrate (e.g., an organic core), a semiconductor substrate (e.g., a semiconductor wafer), the like, or a combination thereof. The substrate 302 may be referred to as having a front side or front surface (e.g., the side facing upwards in FIG. 3A), and a back side or back surface (e.g., the side facing downwards in FIG. 3A). The optical routing structure 300 is subsequently bonded to the routing structure 200 to form an interconnect structure 400 (see FIG. 4C), in some embodiments.

In FIG. 3B, a waveguide structure 310 is formed on the front side of the substrate 302, in accordance with some embodiments. In some embodiments, the waveguide structure 310 may comprise one or more silicon nitride waveguides 314 (also referred to as "nitride waveguides 314") formed in various dielectric layers 316. The dielectric layers 316 may comprise suitable dielectric materials such as silicon oxide or the like, which may be deposited using suitable techniques. In some embodiments, each of the dielectric layers 316 may have a thickness in the range of about 50 nm to about 5000 nm. In some embodiments, the topmost dielectric layer 316 (e.g., the dielectric layer 316 on the front side of the waveguide structure 310) may be a material suitable for dielectric-to-dielectric bonding, such as silicon oxide, silicon oxynitride, silicon carbonitride, or another suitable bonding material formed using CVD or another suitable technique.

A silicon nitride waveguide 314 may be formed, for example, by first depositing a layer of silicon nitride on a dielectric layer 316. The layer of silicon nitride may be formed using a suitable deposition technique, such as CVD, PECVD, LPCVD, PVD, or the like. The layer of silicon nitride may then be patterned using acceptable photolithography and etching techniques to form one or more nitride waveguides 314. For example, a hardmask layer may be formed over the layer of silicon nitride and patterned, in some embodiments. The pattern of the hardmask layer may then be transferred to the layer of silicon nitride using an etching process. The etching process may include, for example, a dry etching process and/or a wet etching process. The etching process may be selective to silicon nitride over silicon oxide or other materials. The layer of silicon nitride may be etched to form recesses defining the nitride waveguides 314, with sidewalls of the remaining unrecessed portions defining sidewalls of the nitride waveguides 314. In some embodiments, more than one photolithography and etching sequence may be used in order to pattern the layer of silicon nitride. A dielectric layer 316 may be deposited over the nitride waveguides 314, and this process may be repeated to form multiple layers of nitride waveguides 314, if desired. In some embodiments, a nitride waveguide 314 may have a thickness in the range of about 50 nm to about 2000 nm or a width in the range of about 60 nm to about 4000 nm. Other materials, thicknesses, dimensions, or techniques are possible. In some embodiments, a dielectric layer 316 may be planarized (e.g., using a CMP process or the like) before forming an overlying nitride waveguide 314 or after forming an underlying nitride waveguide 314.

One nitride waveguide 314 or multiple nitride waveguides 314 may be patterned from a layer of silicon nitride. If multiple nitride waveguides 314 are formed, the multiple nitride waveguides 314 may be individual separate nitride waveguides 314 or connected as a single continuous structure. In some embodiments, one or more of the nitride waveguides 314 form a continuous loop. In some embodiments, nitride waveguides 314 may include other photonic components such as grating couplers, edge couplers, or couplers (e.g., mode converters) that allow optical signals to be transmitted between two nitride waveguides 314 and/or between a nitride waveguide 314 and an external optical structure or photonic component. Individual optical routing structures 300 may be singulated from the substrate 302, in some embodiments.

In some cases, a waveguide formed from silicon nitride (e.g., nitride waveguides 314) may have advantages over a waveguide formed from silicon. For example, silicon nitride has a higher dielectric constant than silicon, and thus a nitride waveguide may have a greater internal confinement of light than a silicon waveguide. This may also allow the performance or leakage of nitride waveguides to be less sensitive to process variations, less sensitive to dimensional uniformity, and less sensitive to surface roughness (e.g., edge roughness or linewidth roughness). The reduced process sensitivity may allow nitride waveguides to be easier or less costly to manufacture than silicon waveguides. These characteristics may allow a nitride waveguide to have a lower propagation loss (e.g., a lower transmission loss or a smaller optical loss coefficient) than a silicon waveguide. In some cases, the propagation loss (dB/cm) of a nitride waveguide may be between about 0.1% and about 50% of a silicon waveguide. In some cases, a nitride waveguide may also be less sensitive to the temperature of the environment than a silicon waveguide. For example, a nitride waveguide may have a sensitivity to temperature that is as small as about 1% of that of a silicon waveguide. In this manner, a nitride waveguide may be more suitable for transmitting optical signals over relatively longer distances than a silicon waveguide, in some cases.

In some embodiments, a thermal process, such as an anneal, is performed on the waveguide structure 310. The thermal process may comprise a temperature in the range of about 600° C. to about 1500° C., though other temperatures are possible. The thermal process may comprise an ambient environment of nitrogen gas (e.g., $N_2$) or the like, or may comprise a low-pressure environment such as a vacuum. In some embodiments, the thermal process may be performed for between about 120 seconds and about 3 hours. Other parameters are possible.

In some cases, performing a thermal process on the silicon nitride waveguides (e.g., nitride waveguides 314) can reduce defects and impurities within the silicon nitride, which can improve performance of the silicon nitride waveguides. For example, annealing the nitride waveguides 314 may reduce propagation loss of the nitride waveguides 314, which can allow for more efficient transmission of optical signals or optical power. In this manner, annealing the nitride waveguides 314 can allow for improved device performance, improved signal-to-noise of optical signals, improved transmission over longer distances, more efficient transmission of optical signals, or reduced power consumption. In some cases, performing a thermal process at higher temperatures (e.g., greater than about 1000° C.) may improve performance of nitride waveguides 314 more than performing a thermal process at lower temperatures (e.g., less than about 1000° C.). However, in some cases, exposing conductive features (e.g., the redistribution structure 210) to these higher temperatures may cause thermal damage such as thermally-induced defects, undesirable diffusion of conductive material, or other problems. By forming the waveguide structure 310 and the redistribution structure 210 on separate substrates, a thermal process may be performed at higher temperatures on the waveguide structure 310 without subjecting the redistribution structure 210 to the higher temperatures. In this manner, high-performance nitride waveguides 314 may be formed without risk of thermal damage to the redistribution structure 210. Accordingly, the nitride waveguides 314 that are annealed at higher temperatures may be referred to herein as "high-performance nitride waveguides."

Figure 4A:
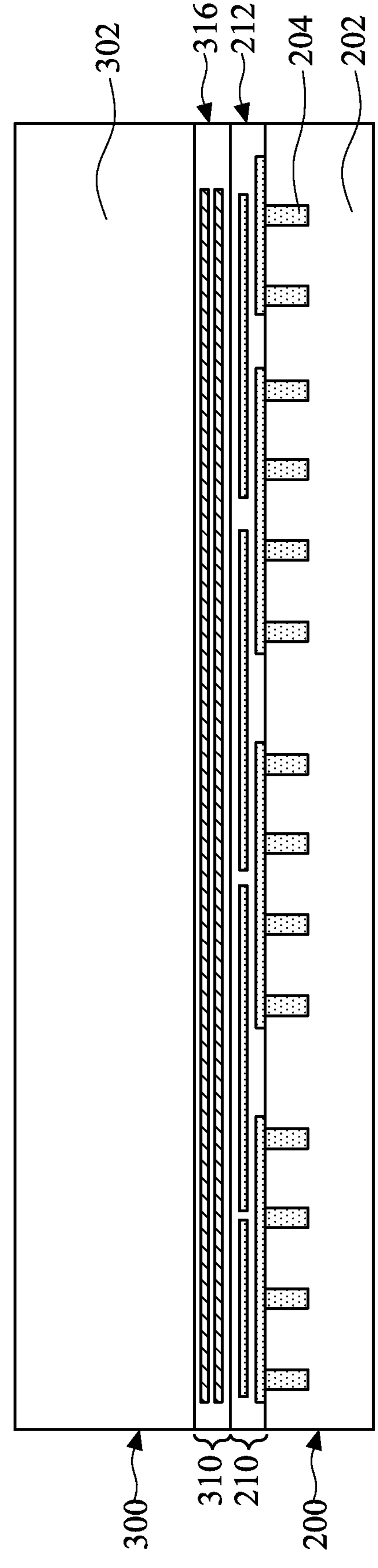
FIGS. 4A, 4B, and 4C illustrate cross-sectional views of intermediate steps of forming an interconnect structure, in accordance with some embodiments.
Figure 4A:
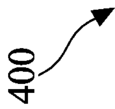
Figure 4B:
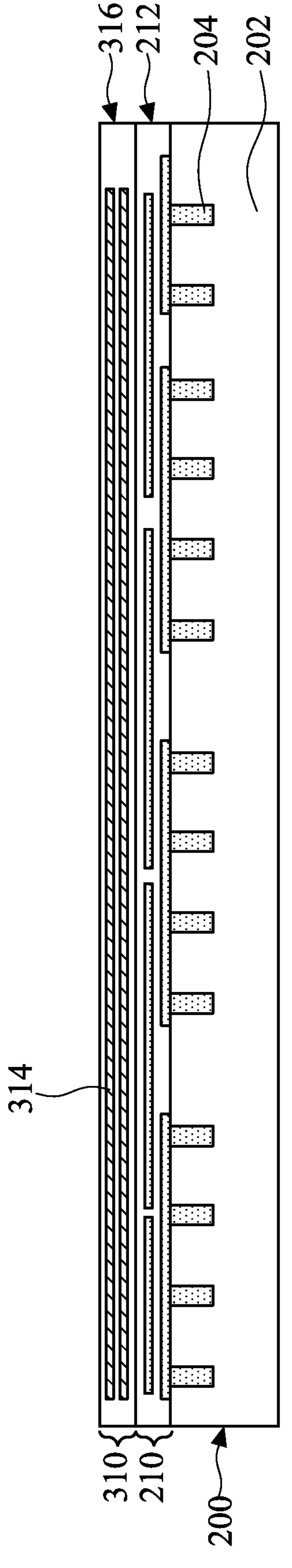
Figure 4C:
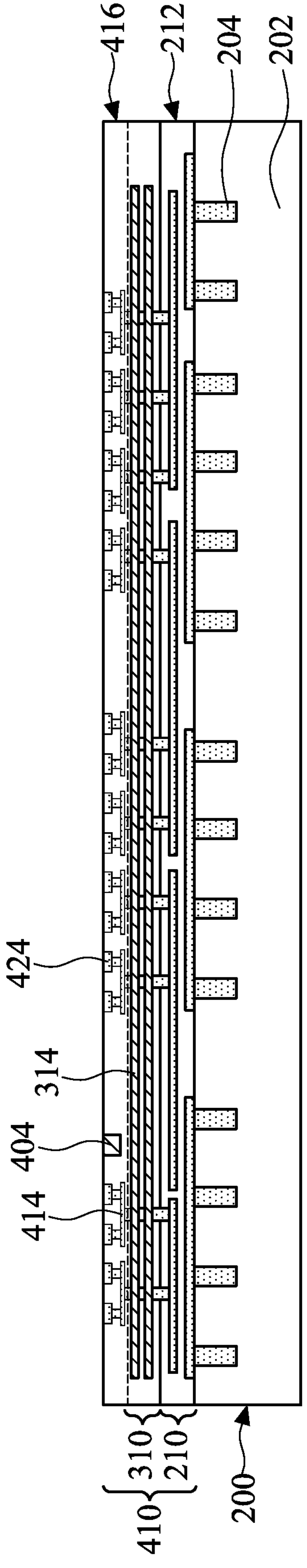
Figure 4C:
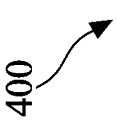

In FIGS. 4A, 4B, and 4C, the routing structure 200 is bonded to the optical routing structure 300 to form an interconnect structure 400, in accordance with some embodiments. The interconnect structure 400 allows for both electrical interconnection from the redistribution structure 210 and optical interconnection from the waveguide structure 310. In this manner, the interconnect structure 400 may be considered a "hybrid interconnect structure" or "hybrid interposer." As discussed above, the interconnect structure 400 allows for higher-performance optical interconnection without causing reduced performance of electrical communication. The routing structure 200 and/or the optical routing structure 300 may be singulated before or after being bonded together, in some embodiments.

In FIG. 4A, the optical routing structure 300 is flipped upside-down and bonded to the routing structure 200, in accordance with some embodiments. The optical routing structure 300 is flipped upside-down such that the front side of the optical routing structure 300 faces the front side of the routing structure 200. The waveguide structure 310 of the optical routing structure 300 is then bonded to the redistribution structure 210 of the routing structure 200 by dielectric-to-dielectric bonding (e.g., direct bonding, fusion bonding, oxide-to-oxide bonding, hybrid bonding, or the like). In such embodiments, covalent bonds may be formed between topmost dielectric layers, such as the topmost bonding material of the dielectric layers 212 of the redistribution structure 210 and the topmost bonding material of the dielectric layers 316 of the waveguide structure 310. In some embodiments, multiple interconnect structures 400 may be formed over a substrate 202 and then singulated to form individual interconnect structures 400.

In some embodiments, before performing the bonding process, an optional surface treatment is performed on the topmost dielectric layer 212 of the redistribution structure 210 and/or the topmost dielectric layer 316 of the waveguide structure 310. The surface treatment may include, for example, an activation process, a cleaning process, a dry treatment, a wet treatment, a plasma treatment, exposure to an inert gas, exposure to $H_2$, exposure to $N_2$, exposure to $O_2$, the like, or a combination thereof. However, any suitable activation process may be utilized. The optical routing structure 300 is then aligned with the routing structure 200 and placed into physical contact with the routing structure 200. For example, the topmost dielectric layer 212 of the redistribution structure 210 may be placed in physical contact with the topmost dielectric layer 316 of the waveguide structure 310. The optical routing structure 300 and the routing structure 200 may then be subjected to a thermal treatment and/or contact pressure to bond the optical routing structure 300 and the routing structure 200. In this manner, the dielectric-to-dielectric bonding of the optical routing structure 300 and the routing structure 200 forms a bonded structure or a "composed interposer.". In some embodiments, the bonded structure is baked, annealed, pressed, or otherwise treated to strengthen or finalize the bonds.

In FIG. 4B, the substrate 302 of the optical routing structure 300 is removed, in accordance with some embodiments. The substrate 302 may be removed, for example, using a planarization process (e.g., a CMP process, a grinding process, or the like) and/or an etching process (e.g., a wet etch or a dry etch). Removing the substrate 302 may expose the waveguide structure 310, as shown in FIG. 4B.

In FIG. 4C, additional conductive features 414 are formed in additional dielectric layers 416, in accordance with some embodiments. The additional conductive features 414 and additional dielectric layers 416 may be formed on the top surface of the waveguide structure 310. The additional conductive features 414 may comprise conductive lines, conductive vias, redistribution layers, metallization patterns, bond pads, through vias, or the like. In some cases, the additional conductive features 414 and additional dielectric layers 416 may be considered a redistribution structure. For example, the additional conductive features 414 may comprise bond pads 424 at the top surface of the additional dielectric layers 416. In some embodiments, the bond pads 424 may have a pitch in the range of about 4000 nm and about 9000 nm, though other pitches or other bond pad 424 dimensions are possible. The additional conductive features 414 may also comprise through vias that extend through the waveguide structure 310 and make electrical connection to conductive features 214 of the redistribution structure 210. In this manner, the additional conductive features 414 may be electrically connected to the conductive features 214. The redistribution structure 210, the waveguide structure 310, the additional conductive features 414, and the additional dielectric layers 416 may be collectively referred to as the hybrid structure 410 herein.

The additional conductive features 414 may be formed using materials or techniques similar to those described previously, such as for the conductive features 214 of the redistribution structure 210 or the electrical routing 114 of the photonic package 100. The additional conductive features 414 may be formed using different materials or techniques than the conductive features 214 or the electrical routing 114 in some embodiments. The additional dielectric layers 416 may be formed using materials or techniques similar to those described previously, such as for the dielectric layers 108, 212, or 316. The additional dielectric layers 416 may be formed using different materials or techniques than the dielectric layers 108, 212, or 312 in some embodiments. In some embodiments, the topmost additional dielectric layers 416 may be a material suitable for dielectric-to-dielectric bonding, such as silicon oxide, silicon oxynitride, silicon carbonitride, or another suitable material formed using CVD or another suitable technique. This topmost bonding material may be similar to the topmost bonding material of the dielectric layers 212 and/or the dielectric layers 316, in some cases.

In some embodiments, one or more optical couplers 404 may be formed in the additional dielectric layers 416 of the hybrid structure 410. The optical couplers 404 may facilitate optical coupling between the nitride waveguides 314 and an overlying component, such as an overlying photonic component, photonic device, photonic package, laser die, optical fiber, grating coupler, waveguide, or the like. In this manner, optical signals and/or optical power may be transmitted between the nitride waveguides 314 and overlying structures. In some embodiments, an optical coupler 404 may be formed by etching a recess in the additional dielectric layers 416 and then filling the recess with a suitable material. The suitable material may be, for example, silicon nitride, silicon oxide, optical adhesive, polymer, spin-on glass, or another material. In some embodiments, a planarization process (e.g., a CMP process or the like) may be performed such that the various top surfaces of the hybrid structure 410 are approximately level. As shown in FIG. 5D, the waveguide structure 310, the redistribution structure 210, the additional dielectric layers 416, and/or the substrate 202 may have coplanar sidewalls.

Figure 5A:
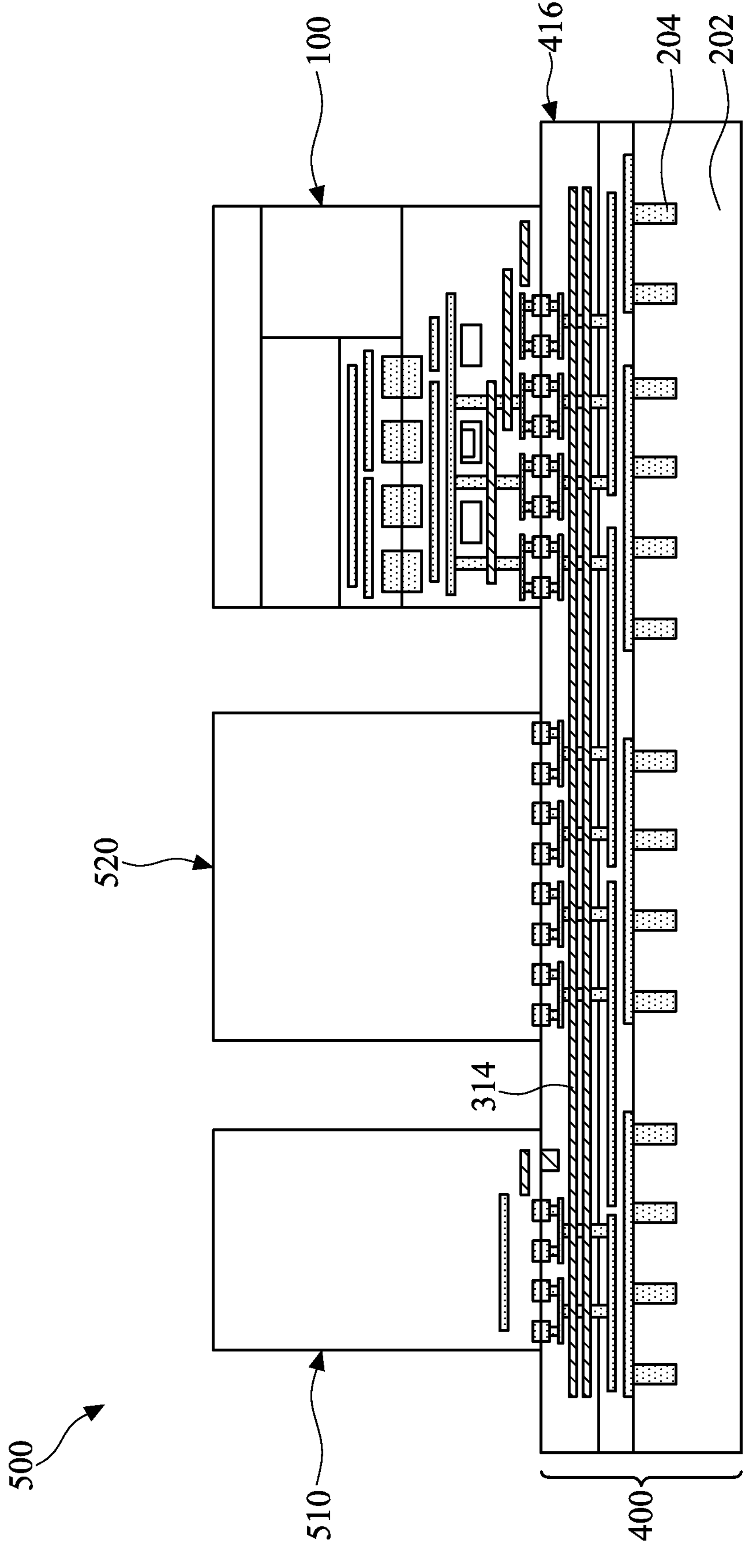
FIGS. 5A, 5B, 5C, and 5D illustrate cross-sectional views of intermediate steps of forming a photonic structure, in accordance with some embodiments.
Figure 5B:
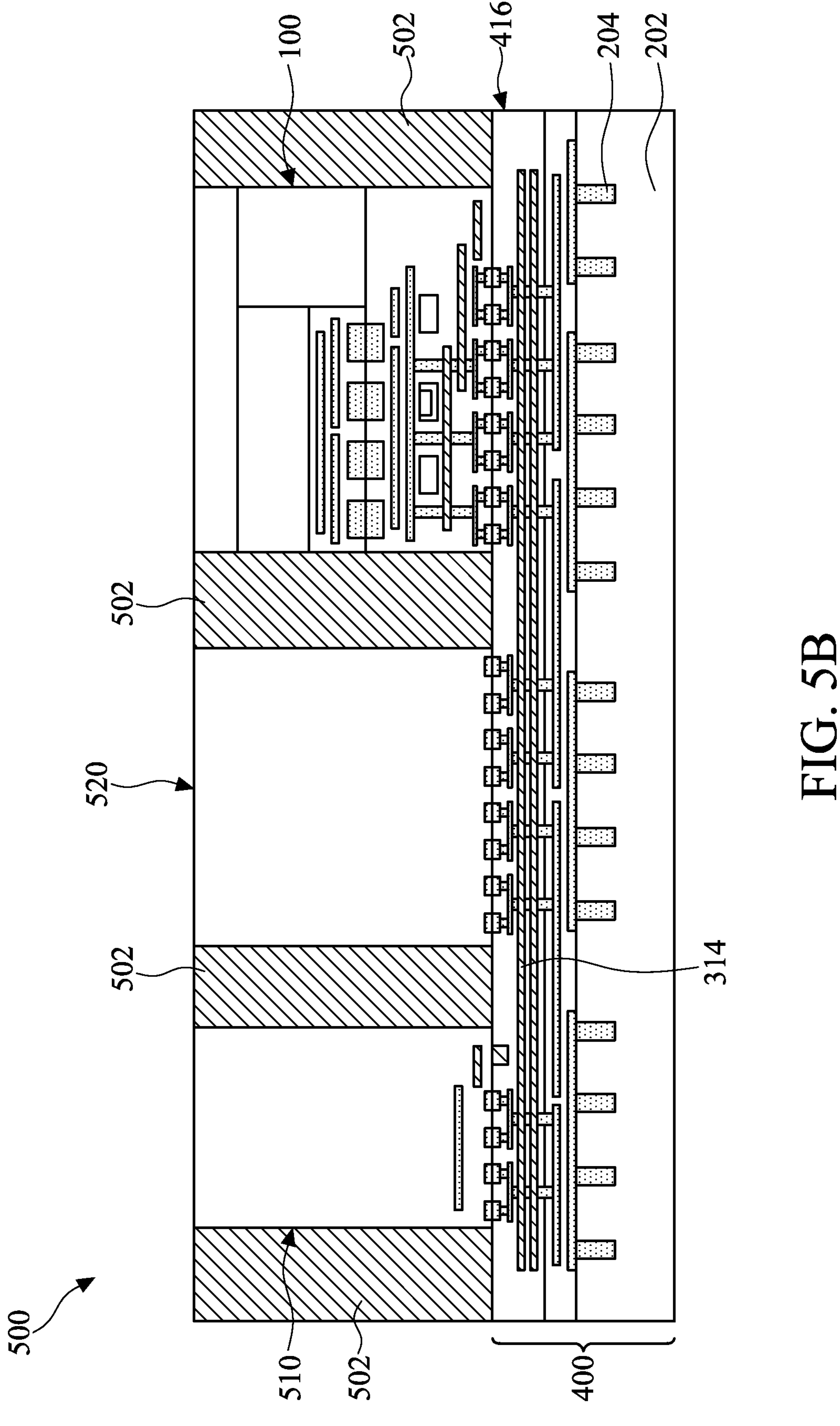
Figure 5C:
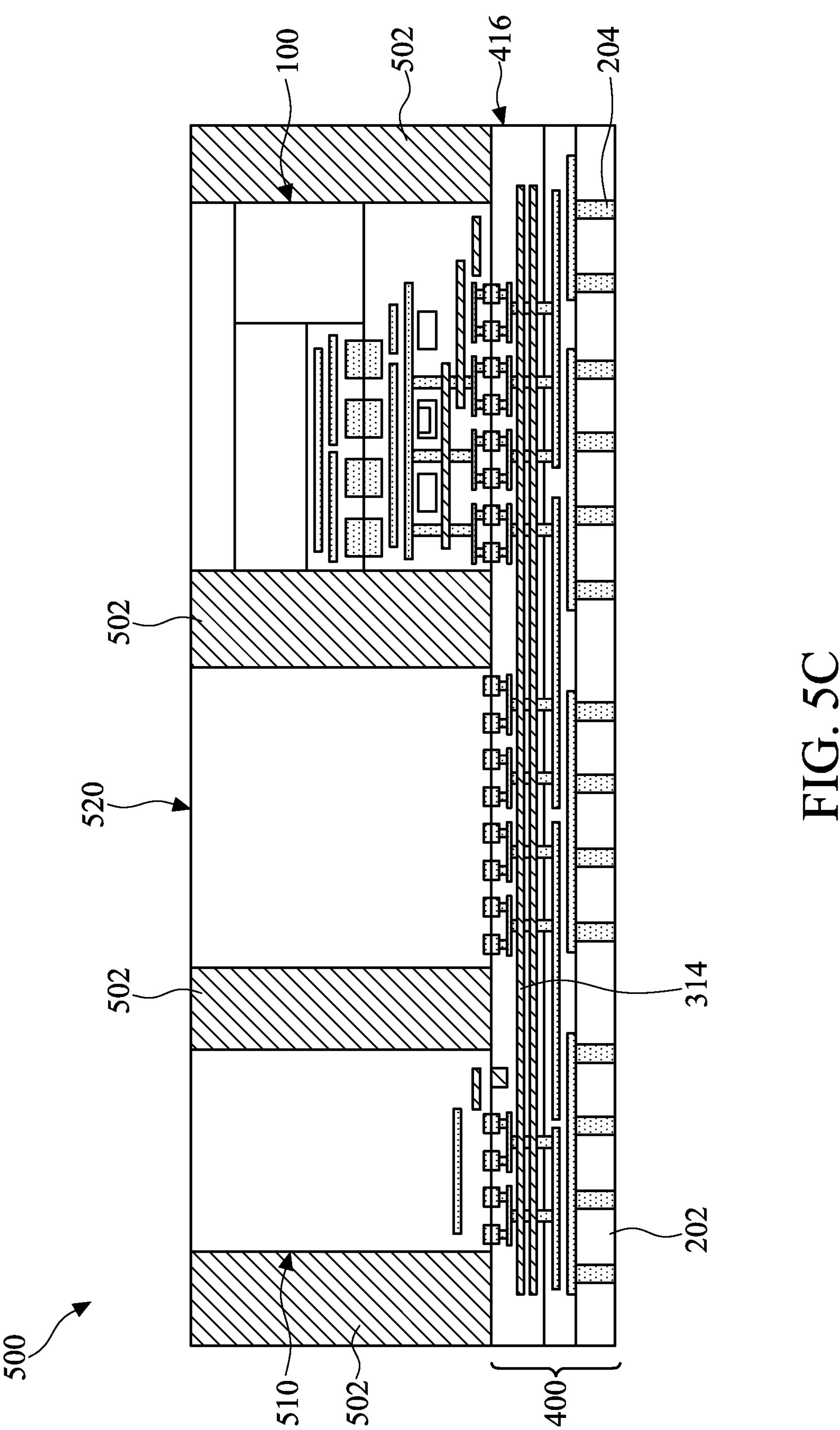
Figure 5D:
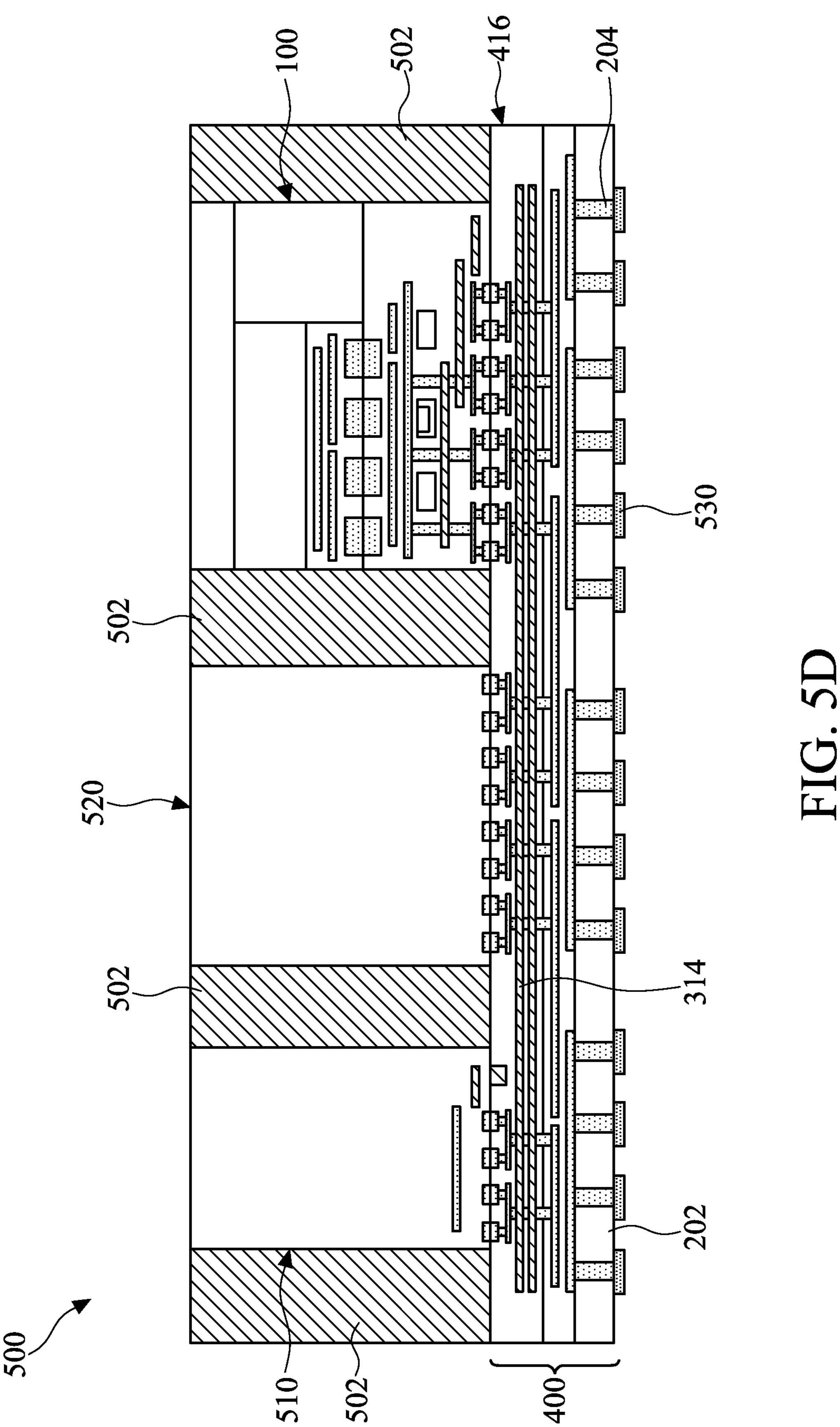

FIGS. 5A, 5B, 5C, and 5D illustrate the formation of a photonic structure 500, in accordance with some embodiments. In FIG. 5A, a photonic package 100, a photonic die 510, and a semiconductor die 520 are attached to the interconnect structure 400, in accordance with some embodiments. Different numbers, arrangements, or types of photonic packages 100, photonic dies 510, or semiconductor dies 520 may be attached to the interconnect structure 400 in other embodiments. In other embodiments, the interconnect structure 400 may be free of photonic dies 510 or semiconductor dies 520.

In some embodiments, the photonic package 100, the photonic die 510, and/or the semiconductor die 520 are bonded to the interconnect structure 400 by dielectric-to-dielectric bonding and/or metal-to-metal bonding (e.g., direct bonding, fusion bonding, oxide-to-oxide bonding, hybrid bonding, or the like). In such embodiments, covalent bonds may be formed between bonding layers, such as the topmost dielectric layer 416 and surface dielectric layers (not individually shown) of each of the photonic package 100, the photonic die 510, and/or the semiconductor die 520. During the bonding, metal-to-metal bonding may also occur between the bond pads 424 of the interconnect structure 400 and bond pads of the photonic package 100, bond pads of the photonic die 510, and/or bond pads of the semiconductor die 520. In this manner, the photonic die 510, and/or the semiconductor die 520 may be electrically connected to the interconnect structure 400.

The photonic package 100 may be similar to the photonic package 100 as described previously for FIGS. 1A-1C. In some embodiments, a waveguide 104 of the photonic package 100 may be optically coupled to a waveguide 314 of the interconnect structure 400. An optical coupler (e.g., similar to optical coupler 404) between the photonic package 100 and the waveguides 314 is not shown in FIG. 5A but may be present in other embodiments. In this manner, optical signals and/or optical power may be transmitted between the waveguides 104 of the photonic package 100 and the waveguides 314 of the interconnect structure 400.

The photonic die 510 may be, for example, a chip, die, system-on-chip (SoC) device, system-on-integrated-circuit (SoIC) device, package, the like, or a combination thereof. In some embodiments, the photonic die 510 may comprise a laser diode, an LED, photonic components (e.g., photodetectors, modulators, mode converters, or the like), waveguides, or other photonic devices or photonic components. In some embodiments, the photonic die 510 is optically coupled to the waveguides 314 of the interconnect structure 400, and optical signals and/or optical power may be transmitted between the photonic die 510 and the waveguides 314. An optical coupler 404 may facilitate optical coupling between the photonic die 510 and the waveguides 314, in some embodiments. For example, in some embodiments, the photonic die 510 includes a laser diode that provides optical power to the waveguides 314. The optical power may also be provided to the photonic package 100 from the waveguides 314, in some embodiments. This is an example, and other photonic dies 510 are possible.

The semiconductor die 520 may be, for example, a chip, die, system-on-chip (SoC) device, system-on-integrated-circuit (SoIC) device, package, the like, or a combination thereof. The semiconductor die 520 may include one or more processing devices, such as a central processing unit (CPU), a graphics processing unit (GPU), an application-specific integrated circuit (ASIC), a high performance computing (HPC) die, the like, or a combination thereof. The semiconductor die 520 may include one or more memory devices, which may be a volatile memory such as dynamic random-access memory (DRAM), static random-access memory (SRAM), high-bandwidth memory (HBM), another type of memory, or the like.

In FIG. 5B, the photonic package 100, the photonic die 510, and the semiconductor die 520 are encapsulated with an encapsulant 502, in accordance with some embodiments. The encapsulant 502 may be a molding compound, epoxy, or the like, and may be applied by compression molding, transfer molding, or the like. The encapsulant 502 may be formed over the interconnect structure 400 such that the photonic package 100, the photonic die 510, and the semiconductor die 520 are buried or covered. The encapsulant 502 may then cured. The encapsulant 502 may be planarized using a planarization process (e.g., a CMP process or the like). In some embodiments, the planarization process exposes top surfaces of the photonic package 100, the photonic die 510, and/or the semiconductor die 520. In other embodiments, one or more of the photonic package 100, the photonic die 510, and the semiconductor die 520 may remain covered. In some embodiments, exposed top surfaces (if any) of the photonic package 100, the photonic die 510, and the semiconductor die 520 are approximately level with top surfaces of the encapsulant 502. In some embodiments, the encapsulant 502 may cover sidewalls of one or more of the photonic package 100, the photonic die 510, and/or the semiconductor die 520. In other embodiments, one or more sidewalls of the photonic package 100, the photonic die 510, and/or the semiconductor die 520 may remain exposed after forming the encapsulant 502.

In FIG. 5C, the back side of the interconnect structure 400 is thinned to reveal the vias 204, in accordance with some embodiments. The back side of the interconnect structure 400 (e.g., the back side of the substrate 202) may be removed using a planarization process (e.g., a CMP process, grinding process, or the like), an etching process, or a combination thereof. In some embodiments, surfaces of the vias 204 and the substrate 202 may be approximately level after the thinning. In some embodiments, the substrate 202 may have a thickness in the range of about 20 μm to about 150 μm after the thinning, but other thicknesses are possible.

In FIG. 5D, conductive pads 530 are formed on the exposed vias 204 and the substrate 202, in accordance with some embodiments. The conductive pads 530 may be conductive pads or conductive pillars that are electrically connected to the hybrid structure 410 by the vias 204. In some embodiments, the conductive pads 530 include underbump metallizations (UBMs). The conductive pads 530 may be formed from a conductive material such as copper, another metal or metal alloy, the like, or combinations thereof. The material of the conductive pads 530 may be formed by a suitable process, such as plating. For example, in some embodiments, the conductive pads 530 are metal pillars (such as copper pillars) formed by a sputtering, printing, electro plating, electroless plating, CVD, or the like. The metal pillars may be solder free and have substantially vertical sidewalls. In some embodiments, a metal cap layer (not shown) is formed on the top of the conductive pads 530. The metal cap layer may include nickel, tin, tin-lead, gold, silver, palladium, indium, nickel-palladium-gold, nickel-gold, the like, or a combination thereof and may be formed by a plating process. In some embodiments, a passivation layer (not shown) may be formed over the substrate 202 to surround or partially cover the conductive pads 530.

Figure 6:
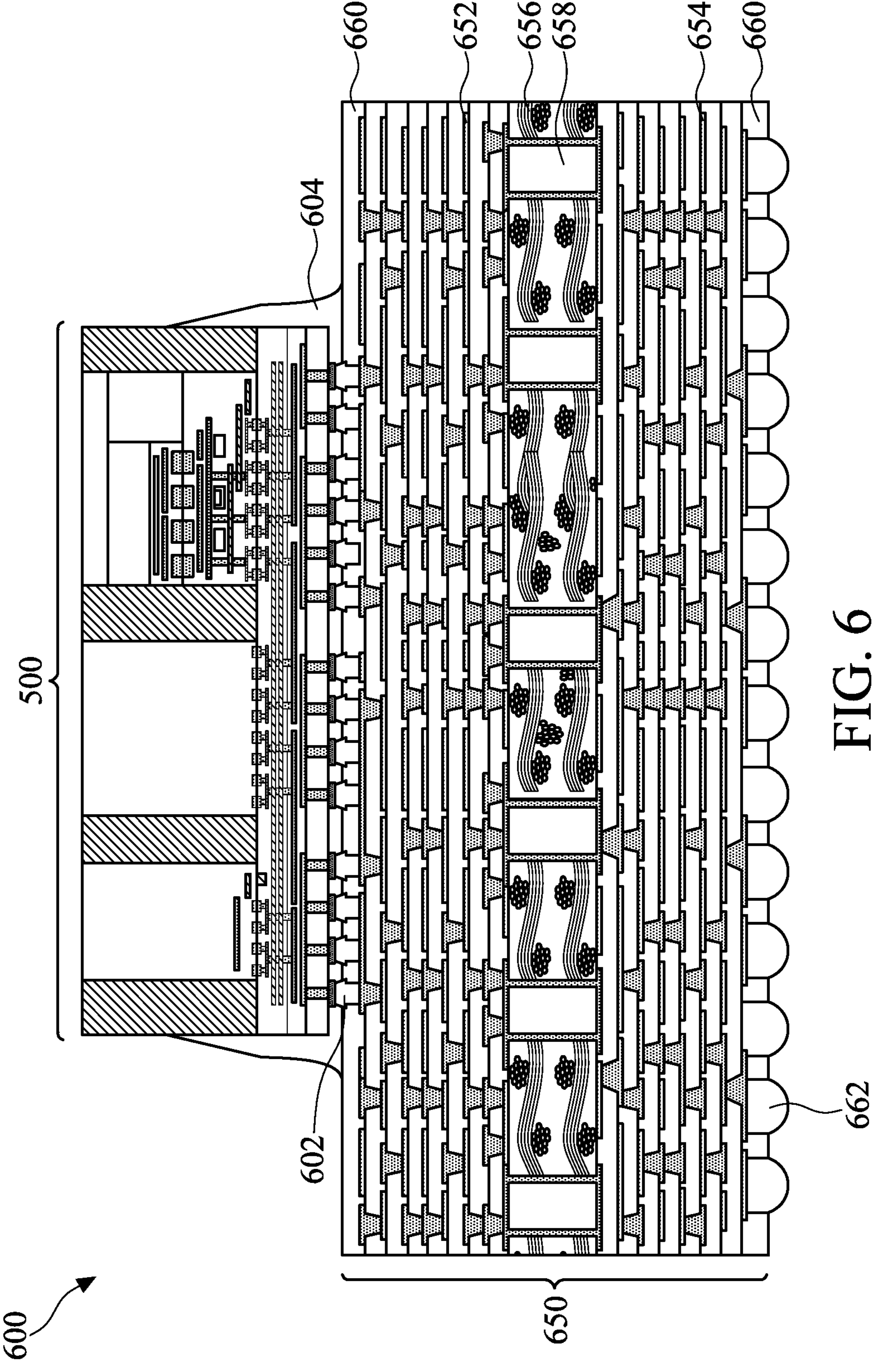
FIG. 6 illustrates a cross-sectional view of a photonic system, in accordance with some embodiments.

In FIG. 6, the photonic structure 500 is attached to an interconnect substrate 650 to form a photonic system 600, in accordance with some embodiments. The interconnect substrate 650 provides additional routing and stability to the photonic structure 500. In some embodiments, the interconnect substrate 650 may be, for example, an interposer, a core substrate, a "semi-finished substrate," a printed circuit board (PCB), or the like. The interconnect substrate 650 may be free of active devices, in some cases. In some embodiments, the interconnect substrate 650 may include routing layers (e.g., routing layers 652 and 654) formed on a core substrate 656. The routing layers 652/654 may comprise conductive lines, conductive vias, or the like formed in various dielectric layers. The core substrate 656 may include a material such as an organic substrate (e.g., an organic core), Ajinomoto build-up film (ABF), a pre-impregnated composite fiber ("prepreg") material, an epoxy, a molding compound, an epoxy molding compound, fiberglass-reinforced resin materials, printed circuit board (PCB) materials, silica filler, polymer materials, polyimide materials, paper, glass fiber, non-woven glass fabric, glass, ceramic, other laminates, the like, or combinations thereof. In some embodiments, the core substrate may be a double-sided copper-clad laminate (CCL) substrate or the like. The routing layers 652 and 654 on opposite sides of the core substrate 656 may be electrically connected through the core substrate 656 by conductive vias 658. In some cases, the conductive vias 658 may be filled with an insulating filler material. In some embodiments, the interconnect substrate 650 may include passivation layers 660 formed over one or more sides of the interconnect substrate 650. The passivation layers 660 may include a material such as a nitride, an oxide, a polyimide, a low-temperature polyimide, a solder resist, a combination thereof, or the like. Once formed, the passivation layers 660 may be patterned (e.g., using a suitable photolithographic and etching process) to expose portions of the routing layers 652 and 654.

Still referring to FIG. 6, conductive connectors 602 are formed on the topmost routing layer 652, and the photonic structure 500 is connected to the interconnect substrate 650 by the conductive connectors 602, in accordance with some embodiments. The conductive connectors 602 may be ball grid array (BGA) connectors, solder balls, metal pillars, controlled collapse chip connection (C4) bumps, micro bumps, electroless nickel-electroless palladium-immersion gold technique (ENEPIG) formed bumps, or the like. The conductive connectors 602 may include a conductive material such as solder, copper, aluminum, gold, nickel, silver, palladium, tin, the like, or a combination thereof. In some embodiments, the conductive connectors 602 are formed by initially forming a layer of solder through such commonly used methods such as evaporation, electroplating, printing, solder transfer, ball placement, or the like. Once a layer of solder has been formed on the structure, a reflow may be performed in order to shape the material into the desired bump shapes. In another embodiment, the conductive connectors 602 are metal pillars (such as a copper pillar) formed by a sputtering, printing, electro plating, electroless plating, CVD, or the like. The metal pillars may be solder free and have substantially vertical sidewalls. In some embodiments, a metal cap layer (not shown) is formed on the top of the conductive connectors 602. The metal cap layer may include nickel, tin, tin-lead, gold, silver, palladium, indium, nickel-palladium-gold, nickel-gold, the like, or a combination thereof and may be formed by a plating process. In some embodiments, conductive connectors 662 may also be formed on the bottommost routing layer 654. The conductive connectors 662 may be similar to one or more of the examples described above for the conductive connectors 602.

The conductive pads 530 of the photonic structure 500 may be placed on the conductive connectors 602. Once in physical contact, a reflow process may be utilized to bond the conductive connectors 602 to the conductive pads 530. The photonic structure 500 may thus be physically and electrically connected to the interconnect substrate 650. In some embodiments, an underfill 604 may be deposited between the photonic structure 500 and the interconnect substrate 650, and may encircle the conductive connectors 602. In this manner, a photonic system 600 may be formed that incorporates both electrical routing and high-performance silicon nitride waveguides.

Figure 7A:
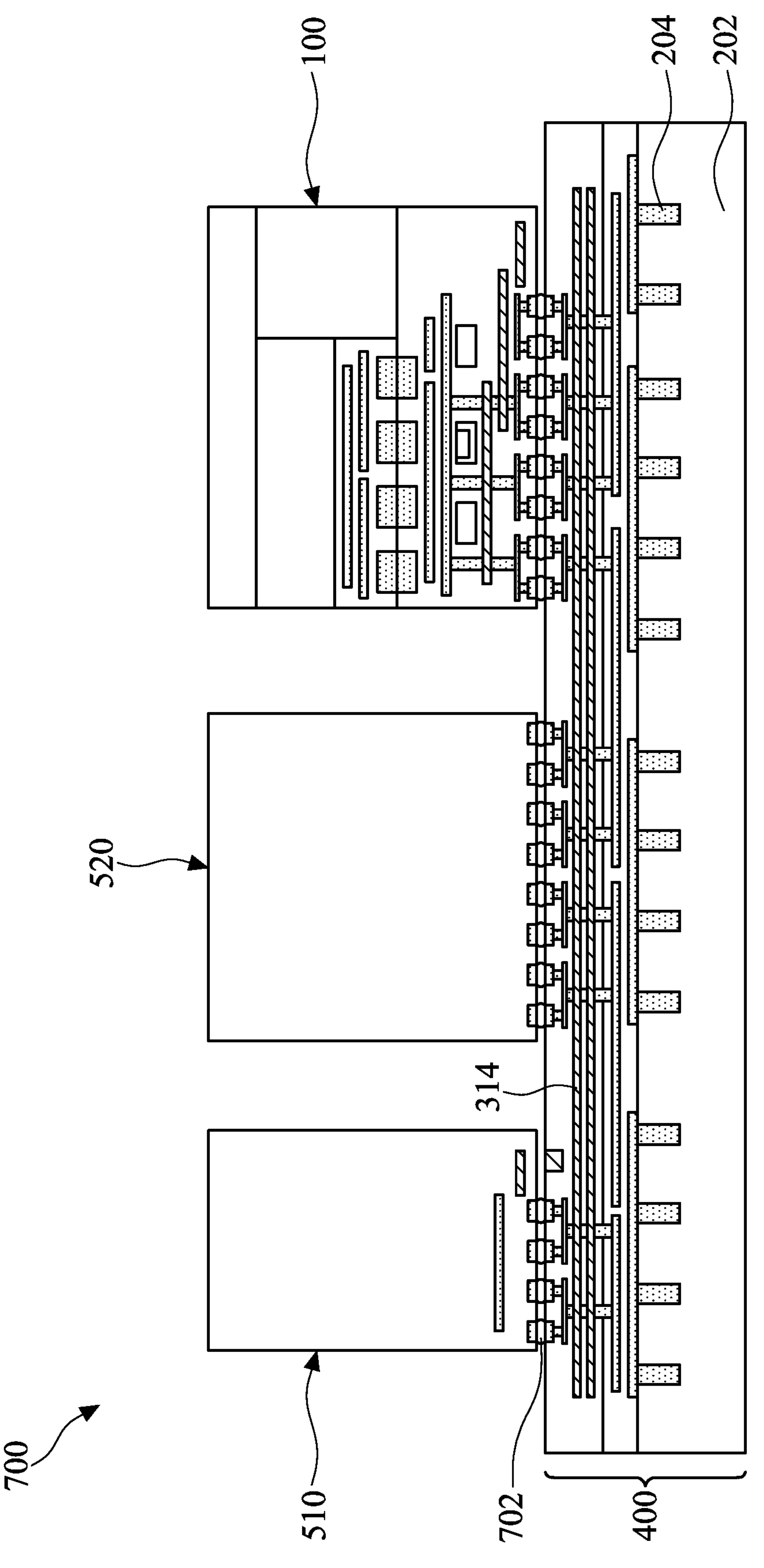
FIGS. 7A, 7B, and 7C illustrate cross-sectional views of intermediate steps of forming an interconnect structure and a photonic system, in accordance with some embodiments.
Figure 7B:
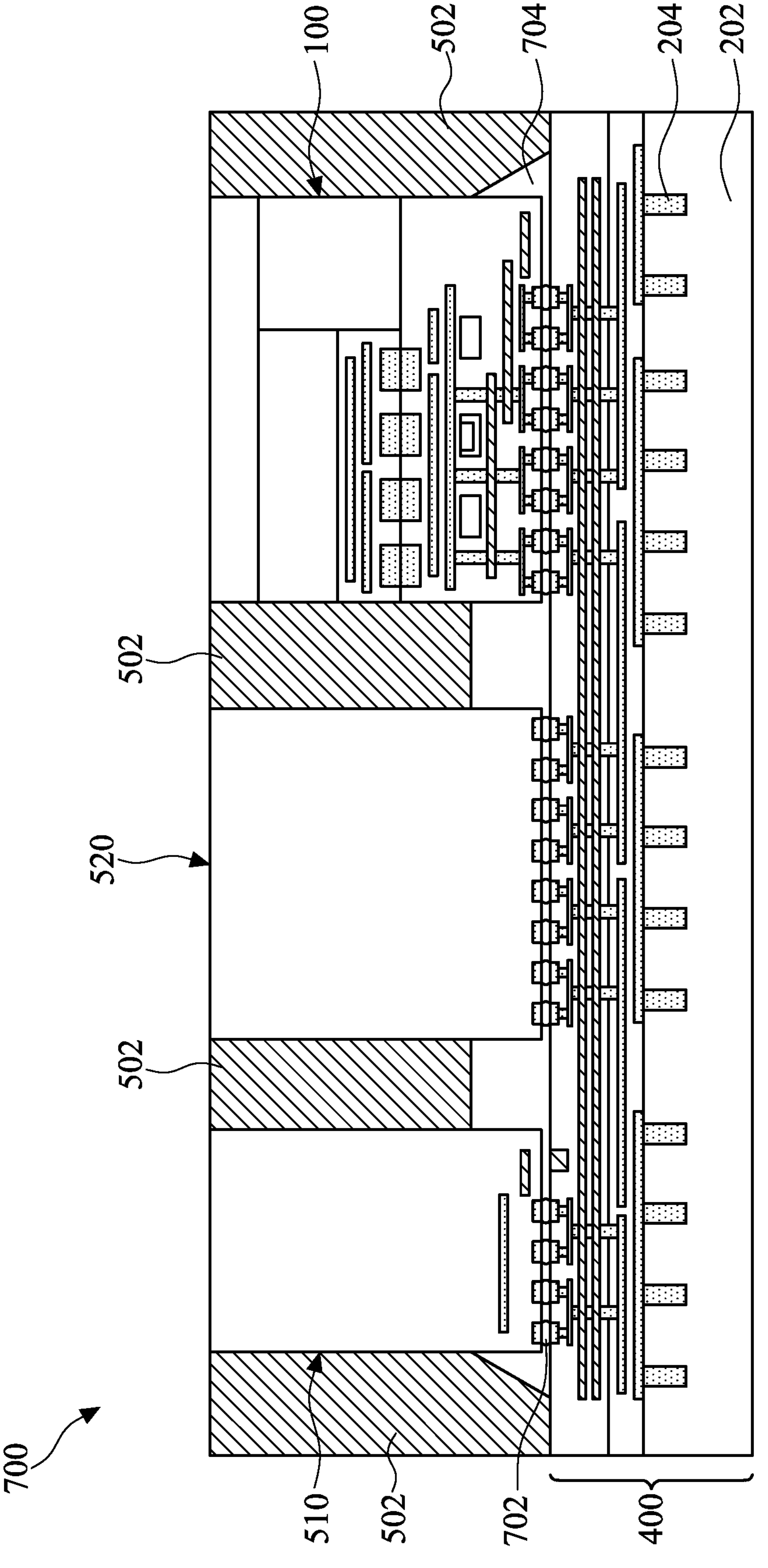
Figure 7C:
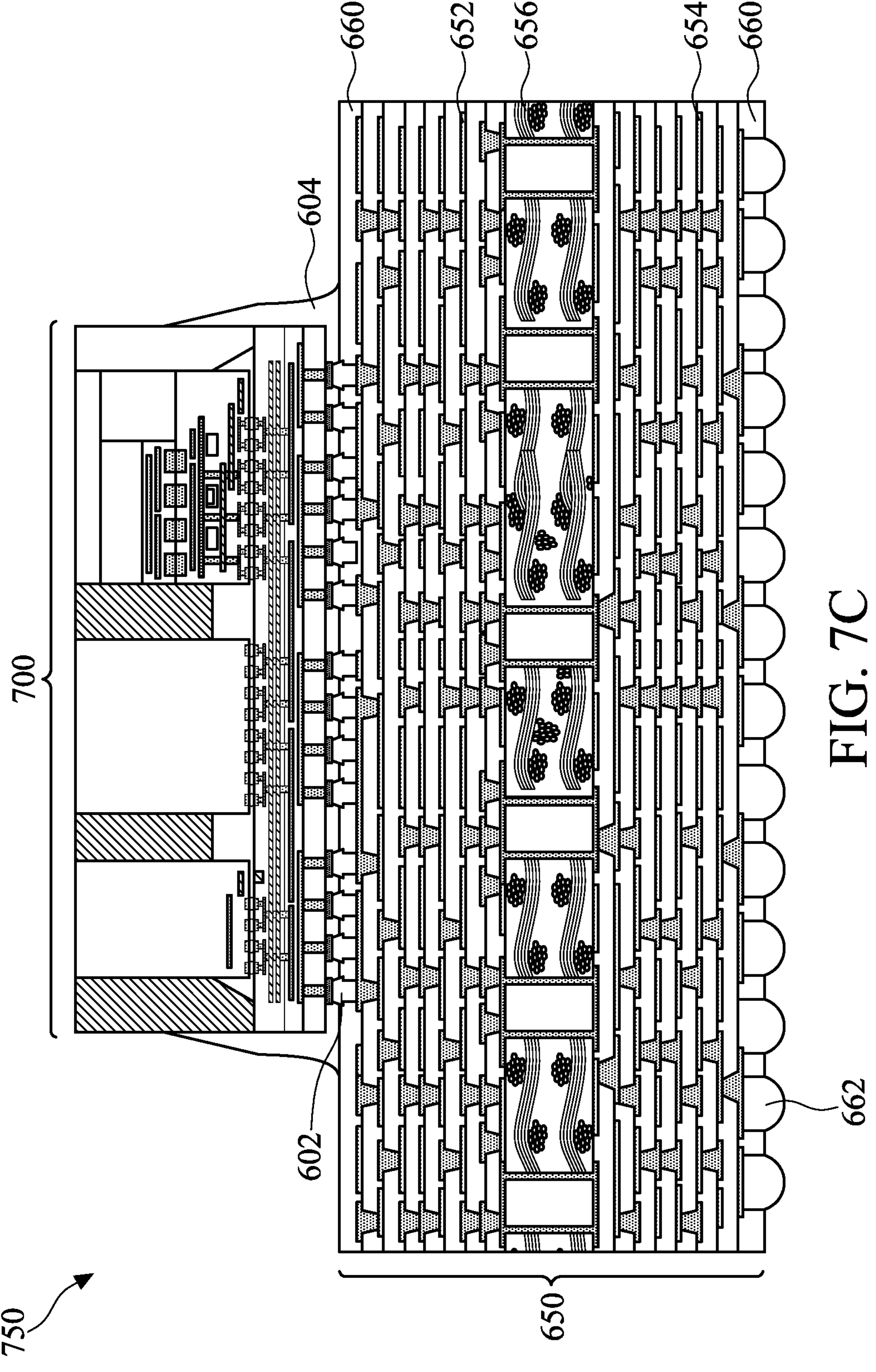

FIGS. 7A, 7B, and 7C illustrate the formation of a photonic structure 700 and a photonic system 750, in accordance with some embodiments. The photonic structure 700 is similar to the photonic structure 500, except that the photonic package 100, the photonic die 510, and the semiconductor die 520 are connected to the interconnect structure 400 by conductive connectors 702 rather than by direct bonding. For example, referring to FIG. 7A, conductive connectors 702 may be formed on the bond pads 424 of the interconnect structure 400 (see FIG. 4C). The conductive connectors 702 may be similar to the conductive connectors 602 described previously or other conductive connectors described herein. After placing the photonic package 100, the photonic die 510, and the semiconductor die 520 on the conductive connectors 702, a reflow process may be performed to bond the photonic package 100, the photonic die 510, and the semiconductor die 520 to the interconnect structure 400. In this manner, the photonic package 100, the photonic die 510, and the semiconductor die 520 may be physically and electrically connected to the interconnect structure.

In FIG. 7B, an underfill 704 may be deposited between the photonic package 100, the photonic die 510, and/or the semiconductor die 520 and the interconnect structure 400. The underfill 704 may also encircle the conductive connectors 702. An encapsulant 502 may then be deposited over the components, similar to the encapsulant 502 described for FIG. 5B. In some embodiments, the photonic package 100 and/or the photonic die 510 may be optically coupled to the waveguides 314 of the interconnect structure 400. The photonic package 100 and/or the photonic die 510 may be optically coupled through the underfill 704, in some embodiments. In other embodiments, the underfill 704 may not be present in the optical coupling paths, or another suitable material (e.g., an optical adhesive or the like) may be deposited in the optical coupling paths before depositing the underfill 704. In other embodiments, some of the components may be directly bonded to the interconnect structure 400 while other components are connected to the interconnect structure 400 using conductive connectors 702. In this manner, a photonic structure 700 utilizing conductive connectors may be formed.

In FIG. 7C, the photonic structure 700 is connected to an interconnect substrate 650 to form a photonic system 750, in accordance with some embodiments. The photonic structure 700 may be bonded to the interconnect substrate 650 using conductive connectors 602, similar to the process described previously for FIG. 6. The interconnect substrate 650 may also be similar to the interconnect substrate 650 described previously for FIG. 6. The photonic structure 700 may thus be physically and electrically connected to the interconnect substrate 650. In some embodiments, an underfill 604 may be deposited between the photonic structure 700 and the interconnect substrate 650, and may encircle the conductive connectors 602. In this manner, a photonic system 750 may be formed that incorporates both electrical routing and high-performance silicon nitride waveguides.

Figure 8A:
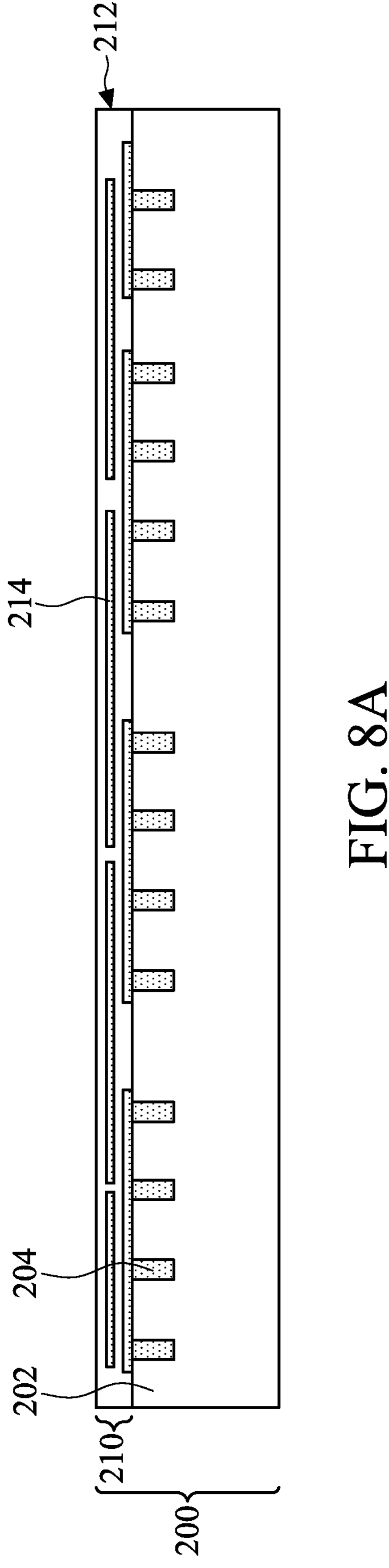

FIG. 8A through 8F illustrate the formation of a photonic structure 800, in accordance with some embodiments. The photonic structure 800 is similar to the photonic structure 500, except that waveguides are formed on the routing structure 200 to form a hybrid routing structure 810. FIG. 8A illustrates a routing structure 200, in accordance with some embodiments. The routing structure 200 shown in FIG. 8A may be similar to the routing structure 200 shown in FIG. 2C. For example, a redistribution structure 210 may be formed over a substrate 202, in which the redistribution structure 210 comprises conductive features 214 formed in dielectric layers 212.

In FIG. 8B, silicon nitride waveguides 814 are formed over the redistribution structure 210, in accordance with some embodiments. In this manner, a hybrid routing structure 810 may be formed. The silicon nitride waveguides 814 may be formed using techniques similar to those described previously for the nitride waveguides 318 described for FIG. 3B. FIG. 8B illustrates a single layer of nitride waveguides 814 formed in a dielectric layer. In other embodiments, the nitride waveguides 814 may comprise multiple layers of nitride waveguides 814 formed in multiple dielectric layers. The nitride waveguides 814 may be coupled to other neighboring nitride waveguides 814, in some cases. In some embodiments, the topmost dielectric layer may be a material suitable for dielectric-to-dielectric bonding, such as silicon oxide, silicon oxynitride, silicon carbonitride, or another suitable bonding material formed using CVD or another suitable technique.

In some embodiments, the nitride waveguides 814 are not annealed. In other embodiments, the nitride waveguides 814 are annealed at relatively low temperatures, such as temperatures less than about 300° C. Annealing the nitride waveguides 814 at lower temperatures can reduce the risk of thermal damage (e.g., to the redistribution structure 210). However, in some cases, the nitride waveguides 814 may have larger optical loss than the high-performance nitride waveguides 314 of the waveguide structure 310. Accordingly, in some embodiments, the nitride waveguides 814 may be used for transmitting optical signals and/or optical power over smaller distances than the high-performance nitride waveguides 314.

Figure 8C:
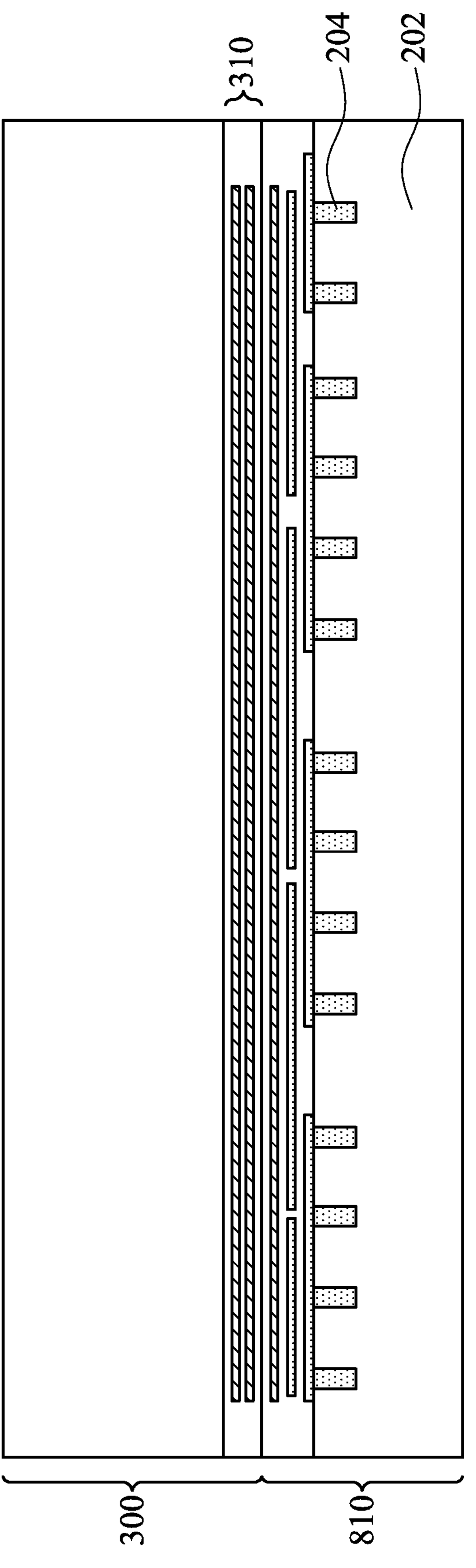
Figure 8D:
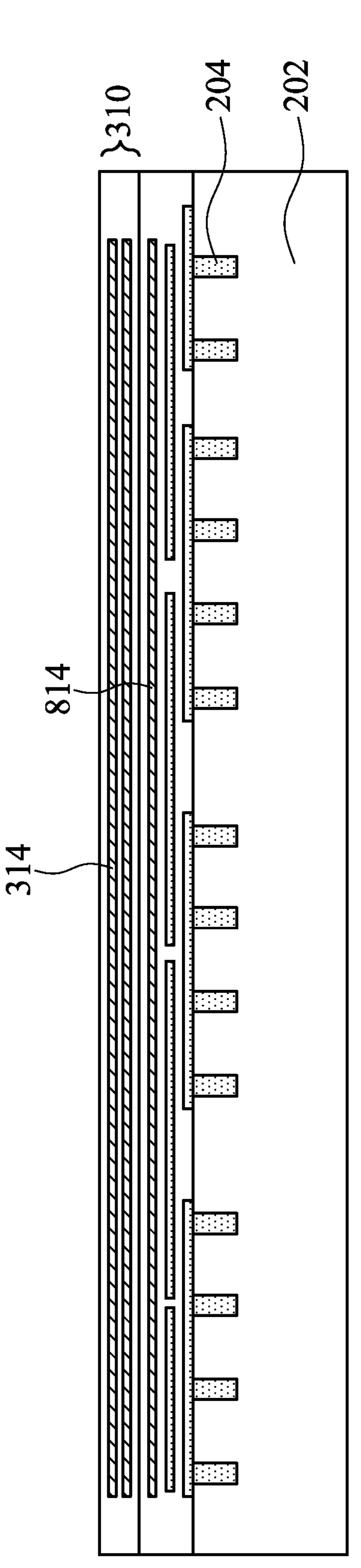
Figure 8D:
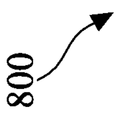

In FIG. 8C, a waveguide structure 310 is bonded to the hybrid routing structure 810, in accordance with some embodiments. The waveguide structure 310 may be bonded to the hybrid routing structure 810 using dielectric-to-dielectric bonding, which may be similar to the bonding described for FIG. 4A. In some embodiments, a nitride waveguide 814 may be optically coupled to a nitride waveguide 314 after the bonding. In FIG. 8D the substrate 302 is removed using a planarization process, and etching process, or the like, which may be similar to the process described previously for FIG. 4B. The waveguide structure 310 may be exposed by the removal of the substrate 302.

In FIG. 8E, additional conductive features 414 are formed on the waveguide structure 310 to form an interconnect structure 850, in accordance with some embodiments. The additional conductive features 414 may be formed in additional dielectric layers 416 using materials or techniques similar to those described previously for FIG. 4C. For example, the additional conductive features 414 may comprise conductive lines, conductive vias, redistribution layers, metallization patterns, bond pads 424, through vias, or the like. One or more optical couplers 404 may also be formed, in some embodiments.

Figure 8F:
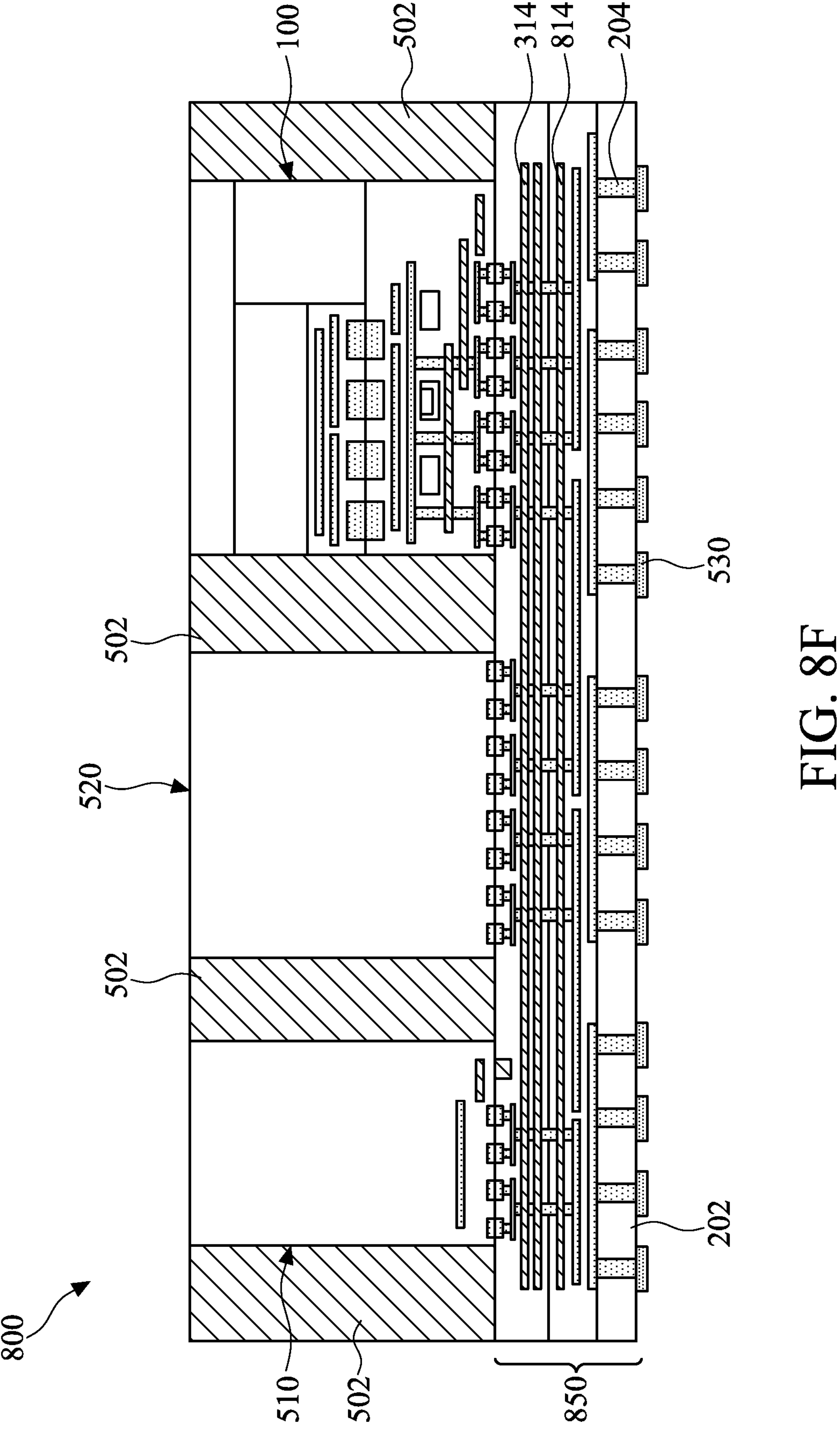

In FIG. 8F, a photonic package 100, a photonic die 510, and a semiconductor die 520 are bonded to the interconnect structure 850 to form a photonic structure 800, in accordance with some embodiments. The photonic package 100, the photonic die 510, and the semiconductor die 520 may be similar to those described previously, and may be bonded using techniques similar to those described previously. For example, the bonding may utilize a direct bonding process or may utilize conductive connectors. An encapsulant 502 may be deposited over the components. Additionally, the substrate 202 may be thinned to expose the vias 204, and conductive pads 530 may be formed on the back side of the substrate 202, in some embodiments. In this manner, a photonic structure 800 may be formed that utilizes high-performance nitride waveguides 314 for longer-distance communication and nitride waveguides 813 for shorter-distance communication.

FIGS. 9A through 9F illustrate the formation of a photonic structure 900 comprising multiple waveguide structures 910, in accordance with some embodiments. FIGS. 9A through 9E illustrate the formation of an interconnect structure 950, which is similar to the interconnect structure 400 except that the interconnect structure 950 includes multiple waveguide structures 910 instead of a single waveguide structure 310. The photonic structure 900 is similar to the photonic structure 500, except that multiple waveguide structures 910 are used instead of a single waveguide structure 310. In some cases, a smaller waveguide structure may have less stress, warping, or bending than a larger waveguide structure. Accordingly, the use of multiple, smaller waveguide structures 910 can reduce the risk of cracking, warping, or other stress-related problems. Thus, yield and performance may be improved, in some cases.

Figure 9A:
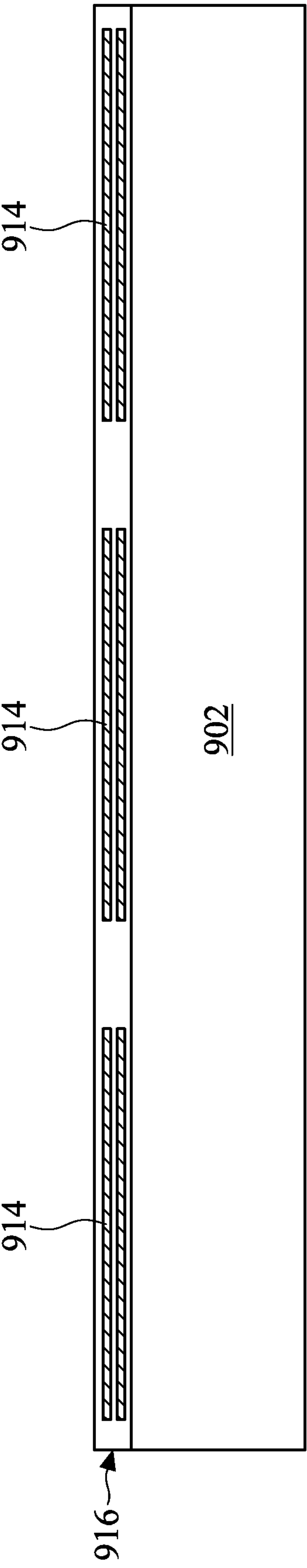

In FIG. 9A, multiple regions of nitride waveguides 914 are formed on a substrate 902. The substrate 902 may be similar to the substrate 302 described previously for FIG. 3A. The nitride waveguides 914 may be formed using materials and techniques similar to those described previously for the waveguide structures 310 (see FIG. 3B). For example, one or more layers of nitride waveguides 914 may be formed in dielectric layers 916. In some embodiments, a high-temperature anneal is performed on the nitride waveguides 914 to improve optical properties, similar to the high-temperature anneal described previously for the waveguides 314. Regions of nitride waveguides 914 may be separated by regions of the dielectric layers 916 that are free of nitride waveguides 914. These waveguide-free regions may be considered “scribe regions” in some cases.

Figure 9B:
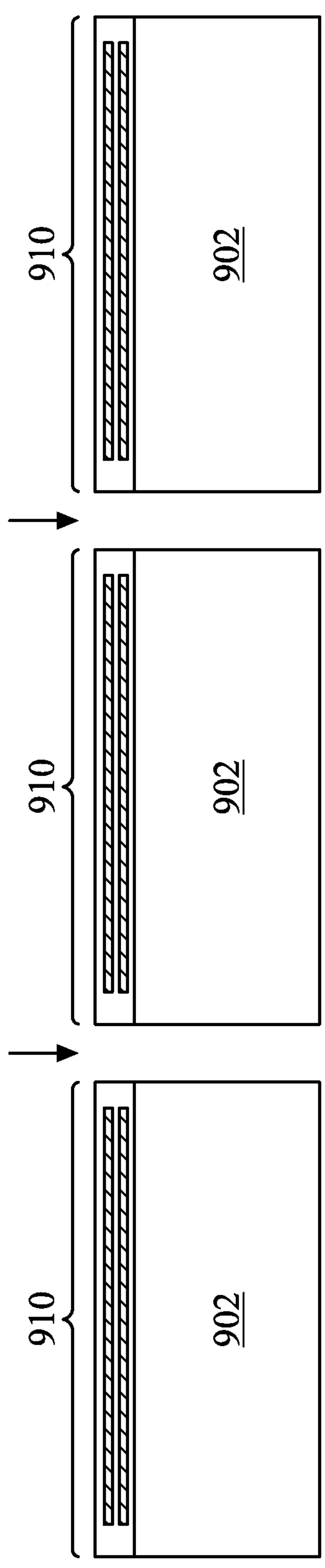

In FIG. 9B, a singulation process is performed to singulate the structure into individual waveguide structures 910 on individual portions of substrate 902. Each waveguide structure 910 comprises nitride waveguides 914 formed in dielectric layers 916. The singulation may be performed using a mechanical saw, a plasma dicing process, a laser dicing process, an etching process, or a combination thereof. Singulating a larger waveguide structure into smaller waveguide structures 910 in this manner may allow for waveguide structures 910 with reduced overall stress, in some cases.

Figure 9C:
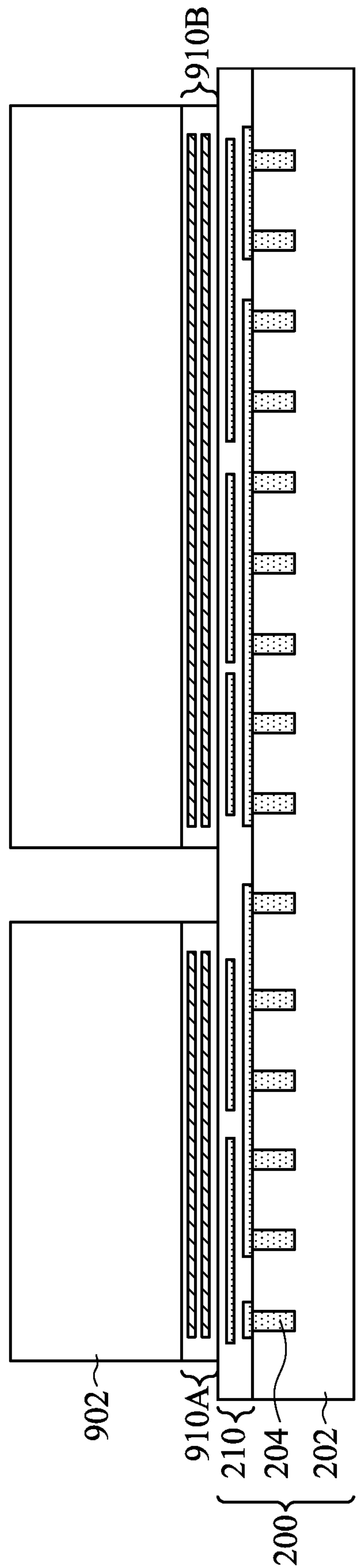

In FIG. 9C, multiple waveguide structures 910A-B are bonded to a routing structure 200, in accordance with some embodiments. The routing structure 200 may be similar to the routing structure 200 described previously. FIG. 9C shows two waveguide structures 910A-B, but more or fewer waveguide structures 910 may be bonded in other embodiments. The waveguide structures 910 may be similar or different. For example, the waveguide structures 910 may have different dimensions, waveguide configurations, or thicknesses. In other embodiments, one or more of the waveguide structures 910 may be free of waveguides. The waveguide structures 910A-B may be bonded to the redistribution structure 210 using dielectric-to-dielectric bonding or the like, which may be similar to a bonding process described previously for FIG. 4A.

Figure 9D:
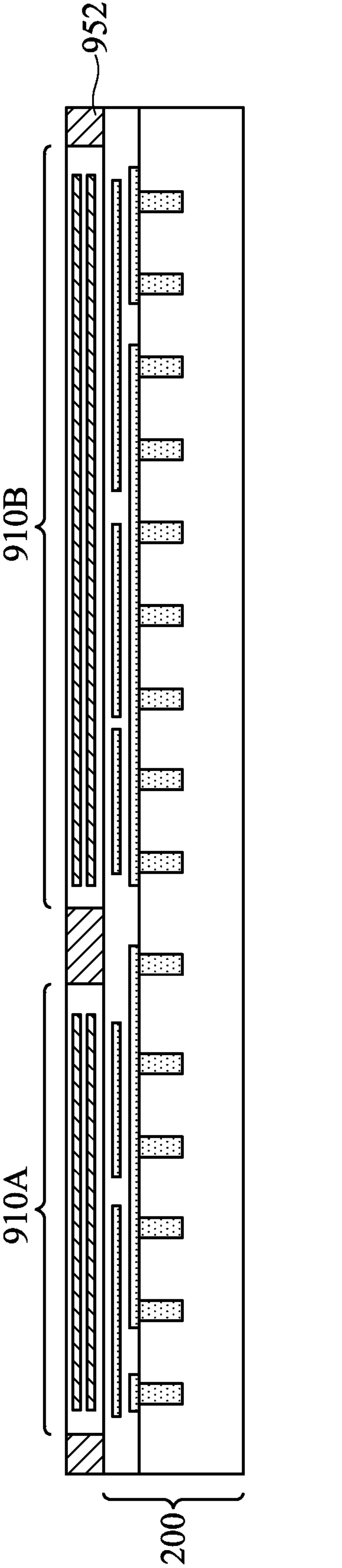

In FIG. 9D, the substrates 902 are removed from over the waveguide structures 910A-B, and a filling material 952 is deposited over the structure, in accordance with some embodiments. The substrates 902 may be removed using a thinning process, a planarization process, an etching process, or a combination thereof, which may be similar to a process described previously for FIG. 4A. Removing the substrates 902 may expose the waveguide structures 910A-B. The filling material 952 may be an oxide, a nitride, an encapsulant, a molding material, a polymer, a spin-on glass, or another suitable dielectric material. In some embodiments, a planarization process is performed such that top surfaces of the filling material 952 and the waveguide structures 910A-B are level.

In FIG. 9E, additional conductive features 954 and additional dielectric layers 956 are formed over the waveguide structures 910A-B and the filling material 952, in accordance with some embodiments. The additional conductive features 954 and additional dielectric layers 956 may be formed using materials or techniques similar to those used to form the additional conductive features 414, bond pads 424, and dielectric layers 416 described for FIG. 4C. The additional conductive features 954 may make electrical contact to the redistribution structure 210. In other embodiments, the additional conductive features 954 may extend into the filling material 952. In some embodiments, one or more optical couplers 955 may be formed in the additional dielectric layers 956.

In other embodiments, the additional conductive features 954 and additional dielectric layers 956 may be formed on the waveguide structures 910 before singulation of the waveguide structures 910, such that each waveguide structure 910 (e.g., 910A or 910B) has its own overlying additional conductive features 954 and additional dielectric layers 956. In such embodiments, a waveguide structure 910 and its overlying additional dielectric layers 956 may have coplanar sidewalls. Additionally, the filling material 952 may extend on the sidewalls of each additional dielectric layers 956 and may separate the additional dielectric layers 956 respectively formed on neighboring waveguide structures 910. In such embodiments, top surfaces of the filling material 952 and each respective additional dielectric layers 956 may be level.

Figure 9F:
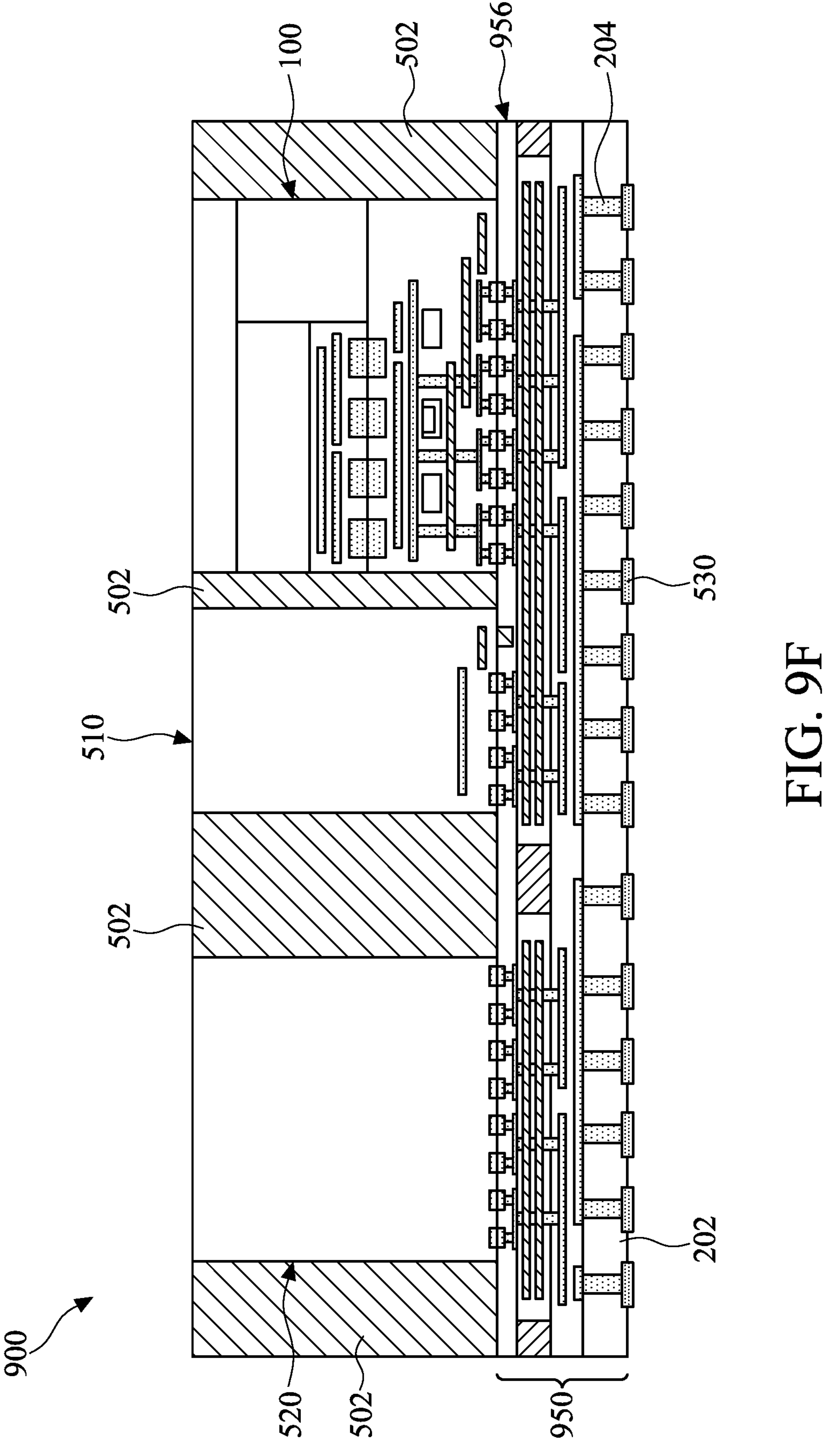

In FIG. 9F, a photonic package 100, a photonic die 510, and a semiconductor die 520 are bonded to the interconnect structure 950 to form a photonic structure 900, in accordance with some embodiments. In the example embodiment of FIG. 9F, the semiconductor die 520 is bonded over the waveguide structure 910A, and the photonic package 100 and the photonic die 510 are bonded over the waveguide structure 910B. The photonic package 100, the photonic die 510, and the semiconductor die 520 may be similar to those described previously, and may be bonded using techniques similar to those described previously. For example, the bonding may utilize a direct bonding process or may utilize conductive connectors. An encapsulant 502 may be deposited over the components. Additionally, the substrate 202 may be thinned to expose the vias 204, and conductive pads 530 may be formed on the back side of the substrate 202, in some embodiments. The photonic structure 900 shown in FIG. 9F is an example, and different numbers, arrangements, or configurations of waveguide structures 910 or components (e.g., dies, packages, or conductive features) are possible.

Embodiments may achieve advantages. The embodiments described herein allow for a photonic system to be formed with improved yield, improved efficiency, improved signal fidelity, and reduced optical loss. By forming nitride waveguides separately from the conductive routing, the nitride waveguides may be annealed at high temperatures that can improve the quality of the nitride waveguides but that may damage conductive routing. For example, high-temperature annealing of nitride waveguides can reduce optical loss and improve optical transmission and optical coupling characteristics. Thus, the benefits of high-temperature annealing may be achieved without risk of damage to other features or components. In this manner, components of a photonic system may communicate more efficiently and over longer distances using optical signals, which can improve operation, power consumption, and speed of the photonic system. For example, transmitting optical signals may have less signal attenuation at high frequencies, lower crosstalk, and less switching noise. Optical communication using the techniques described herein may allow for lower-latency and higher-bandwidth communication, facilitate optical computing, or facilitate quantum computing.

In accordance with an embodiment, a method includes forming a first redistribution structure on a first substrate; forming a waveguide structure on a second substrate, wherein the waveguide structure includes waveguides; bonding the waveguide structure to the first redistribution structure using dielectric-to-dielectric bonding; removing the second substrate; forming a second redistribution structure on the waveguide structure; and connecting a photonic package to the second redistribution structure, wherein the photonic package is optically coupled to the waveguides. In an embodiment, the method includes performing a thermal treatment process on the waveguide structure before bonding the waveguide structure to the first redistribution structure. In an embodiment, the thermal treatment includes an anneal temperature greater than 1000° C. In an embodiment, the waveguides are silicon nitride waveguides. In an embodiment, the second redistribution structure is electrically connected to the waveguide structure. In an embodiment, the method includes forming through vias in the first substrate, wherein the through vias are electrically connected to the first redistribution structure. In an embodiment, the method includes connecting the first substrate to an interconnect substrate, wherein the through vias are electrically connected to the interconnect substrate. In an embodiment, the photonic package is connected to the second redistribution structure by solder bumps.

In accordance with an embodiment, a method includes forming a first interposer, which includes: forming first waveguides over a first substrate; forming a first dielectric layer over the first waveguides; and annealing the first waveguides; and bonding the first dielectric layer to a first redistribution structure; and connecting a die to the first interposer, wherein the die is electrically coupled to the first redistribution structure and optically coupled to the first waveguides. In an embodiment, forming the first interposer includes forming a second redistribution structure over the first waveguides. In an embodiment, the first redistribution structure includes second waveguides. In an embodiment, the first waveguides have a smaller optical transmission loss than the second waveguides. In an embodiment, the first waveguides include silicon nitride. In an embodiment, connecting the die to the first interposer includes bonding the die to the interposer using dielectric-to-dielectric bonding and metal-to-metal bonding. In an embodiment, the method includes connecting the first interposer to an organic core substrate, wherein the first interposer is electrically connected to the organic core substrate. In an embodiment, the method includes connecting a second interposer to the organic core substrate, wherein the second interposer is electrically connected to the organic core substrate, wherein the second interposer is laterally adjacent the first interposer.

In accordance with an embodiment, a package includes an interconnect structure, wherein the interconnect structure includes: a first metallization layer on a substrate; a second metallization layer over the first metallization layer, wherein the second metallization layer is electrically connected to the first metallization layer; a waveguide layer sandwiched between the first metallization layer and the second metallization layer, the waveguide layer including at least one waveguide; and a bonding layer sandwiched between the first metallization layer and the waveguide layer; and a first device over the second metallization layer, wherein the first device comprises a photonic component that is optically coupled to the waveguide layer, wherein the first device is electrically connected to the second metallization layer. In an embodiment, the package includes a second device over the second metallization layer and adjacent the first device, wherein the second device is electrically connected to the second metallization layer. In an embodiment, the first device includes a laser diode. In an embodiment, the waveguide layer and the substrate have coplanar sidewalls.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:

forming a first redistribution structure on a first substrate;

forming a waveguide structure on a second substrate, wherein the waveguide structure comprises a plurality of waveguides in a plurality of dielectric layers, wherein the waveguide structure is free of metal features;

bonding the waveguide structure to the first redistribution structure using dielectric-to-dielectric bonding;

removing the second substrate;

after removing the second substrate, forming a plurality of metal features in the waveguide structure;

forming a second redistribution structure on the waveguide structure; and connecting a photonic package to the second redistribution structure, wherein the photonic package is optically coupled to the plurality of waveguides.

2. The method of claim 1 further comprising performing a thermal treatment process on the waveguide structure before bonding the waveguide structure to the first redistribution structure.

3. The method of claim 2, wherein the thermal treatment comprises an anneal temperature greater than 1000° C.

4. The method of claim 1, wherein the plurality of waveguides are silicon nitride waveguides.

5. The method of claim 1, wherein the second redistribution structure is electrically connected to the waveguide structure.

6. The method of claim 1, wherein forming the plurality of metal features comprises forming through vias in the first substrate, wherein the through vias are electrically connected to the first redistribution structure.

7. The method of claim 6 further comprising connecting the first substrate to an interconnect substrate, wherein the through vias are electrically connected to the interconnect substrate.

8. The method of claim 1, wherein the photonic package is connected to the second redistribution structure by solder bumps.

9. A method comprising:

forming a first interposer, comprising:

forming a plurality of first waveguides over a first substrate;

forming a first dielectric layer over the plurality of first waveguides;

after forming the first dielectric layer, annealing the plurality of first waveguides; and bonding the first dielectric layer to a first redistribution structure; and connecting a die to the first interposer, wherein the die is electrically coupled to the first redistribution structure and optically coupled to the plurality of first waveguides.

10. The method of claim 9, wherein forming the first interposer further comprises forming a second redistribution structure over the plurality of first waveguides.

11. The method of claim 9, wherein the first redistribution structure comprises a plurality of second waveguides.

12. The method of claim 11, wherein the plurality of first waveguides has a smaller optical transmission loss than the plurality of second waveguides.

13. The method of claim 9, wherein the plurality of first waveguides comprise silicon nitride.

14. The method of claim 9, wherein connecting the die to the first interposer comprises bonding the die to the interposer using dielectric-to-dielectric bonding and metal-to-metal bonding.

15. The method of claim 9 further comprising connecting the first interposer to an organic core substrate, wherein the first interposer is electrically connected to the organic core substrate.

16. The method of claim 15 further comprising connecting a second interposer to the organic core substrate, wherein the second interposer is electrically connected to the organic core substrate, wherein the second interposer is laterally adjacent the first interposer.

17. A package comprising:
an interconnect structure, wherein the interconnect structure comprises:
a first metallization layer on a substrate, the first metallization layer comprising at least one first conductive line;
a first bonding layer over the first metallization layer;
a second bonding layer bonded to the first bonding layer;
a waveguide layer on the second bonding layer, the waveguide layer comprising at least one waveguide, wherein at least one waveguide of the waveguide layer overlaps at least one first conductive line of the first metallization layer; and
a second metallization layer over the waveguide layer, wherein the second metallization layer is electrically connected to the first metallization layer through the first bonding layer and the second bonding layer;
and
a first device over the second metallization layer, wherein the first device comprises a photonic component that is optically coupled to the waveguide layer, wherein the first device is electrically connected to the second metallization layer.

18. The package of claim 17 further comprising a second device over the second metallization layer and adjacent the first device, wherein the second device is electrically connected to the second metallization layer.

19. The package of claim 17, wherein the waveguide layer and the substrate have coplanar sidewalls.

20. The package of claim 17, wherein the first metallization layer is within a first dielectric layer, wherein the first dielectric layer and the first bonding layer are different materials.

* * * * *